United States Patent [19]
Nakamura et al.

[11] Patent Number: 6,149,541
[45] Date of Patent: Nov. 21, 2000

[54] GAS ACTUATED DERAILLEUR HAVING AN INDEXING MECHANISM FOR SETTING A CHAIN GUIDE IN A PLURALITY OF FIXED POSITIONS

[75] Inventors: Yasushi Nakamura, Itami; Tadashi Ichida, Sakai, both of Japan

[73] Assignee: Shimano, Inc., Osaka, Japan

[21] Appl. No.: 09/359,964

[22] Filed: Jul. 22, 1999

Related U.S. Application Data

[62] Division of application No. 08/846,265, Apr. 29, 1997.

[30] Foreign Application Priority Data

Aug. 28, 1996 [JP] Japan ................................ 8-226734

[51] Int. Cl.[7] .............................. F16H 63/00; F16H 7/22
[52] U.S. Cl. .............................................. 474/80; 474/122
[58] Field of Search .................................. 474/69, 78, 80, 474/82, 122

[56] References Cited

U.S. PATENT DOCUMENTS

| | | | |
|---|---|---|---|
| 3,742,777 | 7/1973 | Mathauser | 74/242.3 |
| 4,352,503 | 10/1982 | Cotter | 280/238 |
| 4,854,191 | 8/1989 | Nagano | 74/750 B |
| 5,358,451 | 10/1994 | Lacombe et al. | 414/78 |
| 5,624,335 | 4/1997 | Ando | 474/80 |
| 5,860,880 | 1/1999 | Oka | 474/77 |
| 5,890,979 | 4/1999 | Wendler | 474/82 |

FOREIGN PATENT DOCUMENTS

| | | |
|---|---|---|
| 2208635 | 6/1996 | Canada . |
| 120571 | 10/1984 | European Pat. Off. . |
| 2154018 | 5/1973 | France . |
| 3938454 A1 | 5/1991 | Germany . |
| 19514267 | 4/1995 | Germany . |
| 5-338581 | 12/1993 | Japan . |
| 96/19376 | 6/1996 | WIPO . |

OTHER PUBLICATIONS

Hydraulics & Pneumatics, Jul. 1982; pages 3 and 14 (submitted by Applicants).

*Primary Examiner*—Lenard A. Footland
*Assistant Examiner*—Matthew A. Kaness
*Attorney, Agent, or Firm*—James A. Deland

[57] ABSTRACT

A gas actuated derailleur for a bicycle includes a base member, a movable member supporting a chain guide, a coupling mechanism coupling the base member to the movable member so that the movable member moves relative to the base member, and an actuation mechanism responsive to compressed gas for causing the movable member to move relative to the base member.

15 Claims, 17 Drawing Sheets

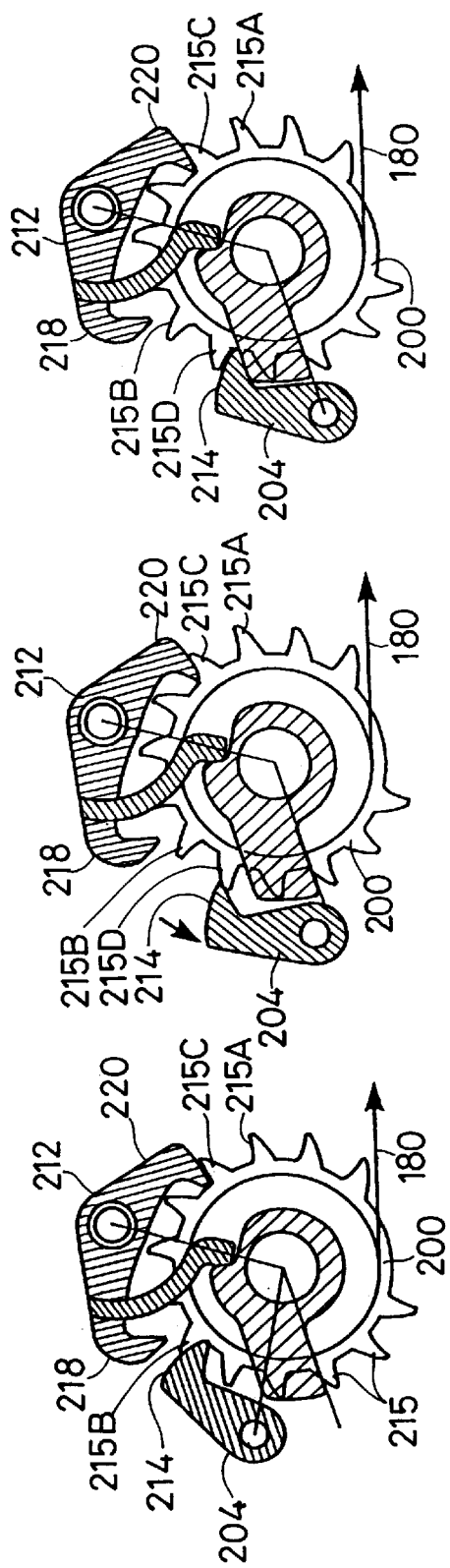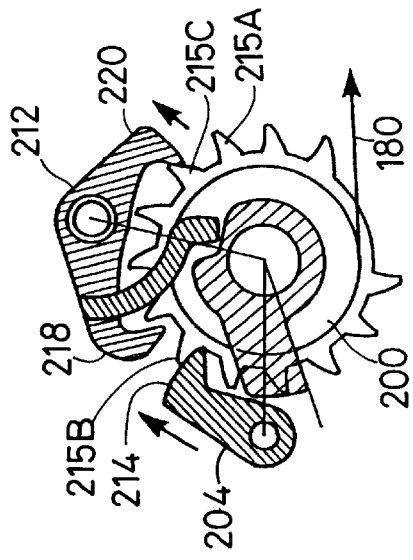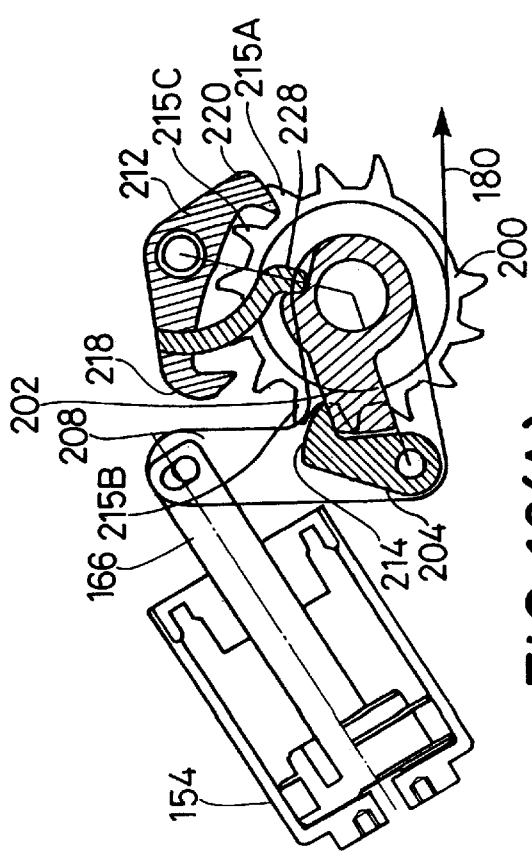

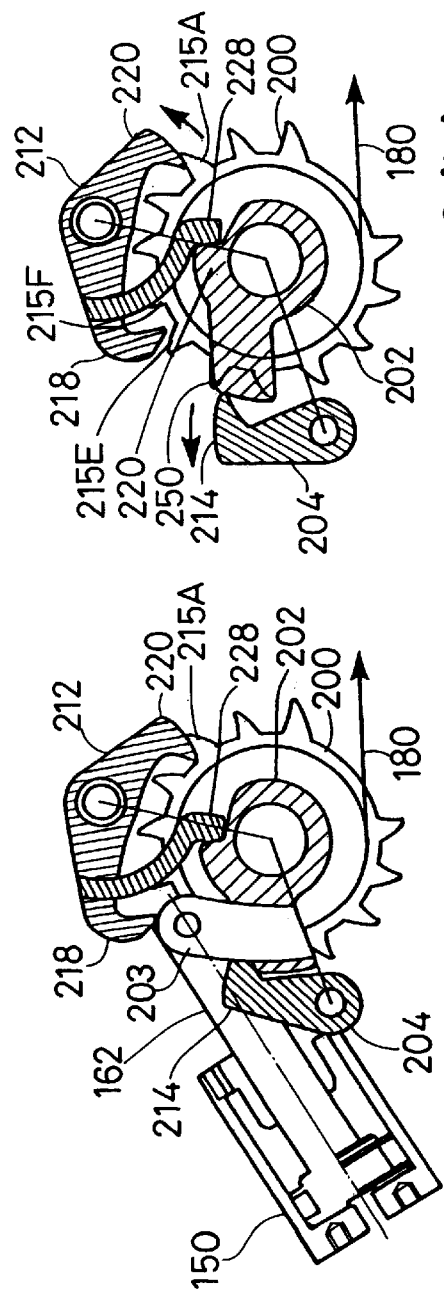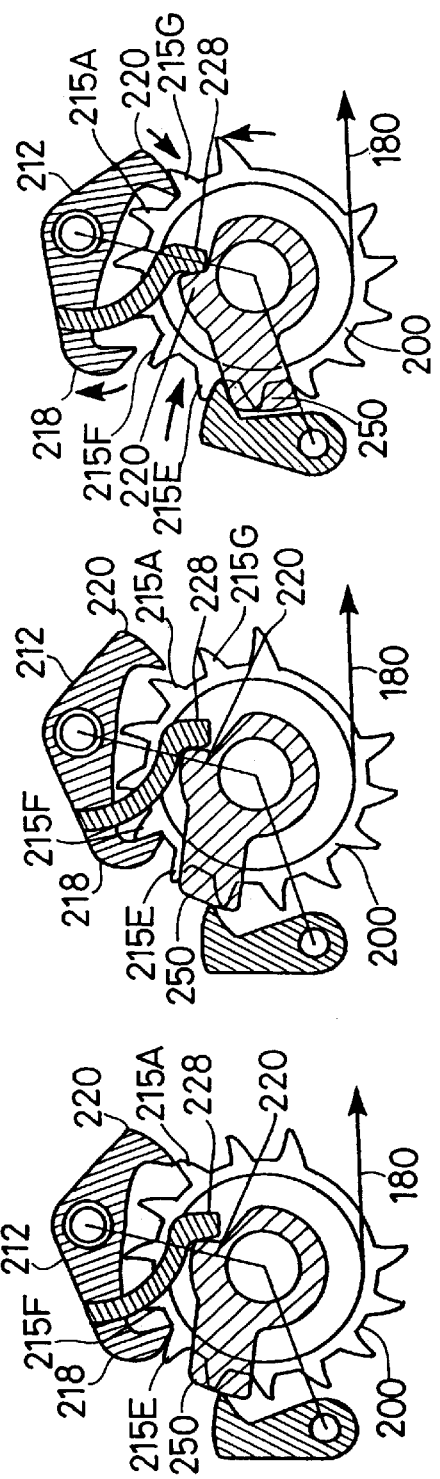

GAS ACTUATED DERAILLEUR HAVING AN INDEXING MECHANISM FOR SETTING A CHAIN GUIDE IN A PLURALITY OF FIXED POSITIONS

CROSS REFERENCE TO RELATED APPLICATION

This application is a division of copending application Ser. No. 08/846,265, filed Apr. 29, 1997.

BACKGROUND OF THE INVENTION

The present invention is directed to bicycle derailleurs and, more particularly, to a bicycle derailleur that is actuated by compressed gas.

A shift unit having a plurality of gears is used on a bicycle in order to climb hills more easily or to ride faster on flat ground. A shift unit generally has a shift control component that the rider uses to make a shift, and a shift mechanism that is linked to the shift control component by a cable.

The shift control component has, for example, two shift levers and a cable winder that rotates via a ratchet mechanism when the shift levers are operated. Shift mechanisms come in external and internal types. An external shift mechanism has a plurality of sprockets that are set up parallel to each other and that have different numbers of teeth, and a derailleur that moves back and forth in the axial direction of the sprockets (hereinafter referred to as the "shift direction") and that is used to guide the chain to one of the sprockets. The derailleur has a mounting component that is mounted to the bicycle frame, and a chain guide component that moves with respect to the mounting component and guides the chain in the shift direction. An internal shift mechanism has a plurality of transmission mechanisms of different gear ratios that are provided inside the rear wheel hub, and a controller that moves back and forth in the hub axial direction or around the hub axis and selects one of the plurality of transmission mechanisms.

With conventional shift units, operation of one of the shift levers causes the cable winder to rotate via the ratchet mechanism in one direction by one gear. As a result, the cable is wound around the cable winder, and a shift, such as from a higher to a lower gear, is made by the shift mechanism. Operation of the other shift lever causes the ratchet mechanism to be released and the cable winder to rotate in the other direction by one gear. As a result, the cable that was wound on the cable winder is played out, and a shift is made in the opposite direction by the shift mechanism.

The majority of the effort expended by the rider during riding, especially during a race, goes into pedaling. Accordingly, an important evaluation of a shift unit is how much it can reduce the effort the rider must exert to operate the shift levers. In order to reduce the effort the rider must exert to operate the shift levers, the stroke of the shift levers must be shortened and their operating force reduced. However, these two requirements are antinomic. For example, the operating force increases if the operating stroke is shortened, and the operating stroke becomes longer if the operating force is reduced. Consequently, with a system whereby a shift is made by winding a cable by means of shift levers, satisfying both of these requirements at the same time is next to impossible.

One known means for solving this problem is an external assisted shifting system that utilizes power from a battery to move the chain guide component of the derailleur. This system is disclosed in Japanese Laid-Open Patent Application 5-338581. This assisted shifting system is equipped with a conversion mechanism, a control mechanism, and an index mechanism. The conversion mechanism has cams and other such members that are provided on the inside of the chain guide component. The purpose of the conversion mechanism is to convert the rotation of the pulley and other rotating members that make up the chain guide component into displacement in the shift direction, that is, to convert rotational movement into linear reciprocal movement. The control mechanism has a control shaft linked to the conversion mechanism and moves back and forth, and a pair of electric solenoids, the rod tips of which engage with the lateral surfaces of the control shaft. This mechanism is used to control the shift direction of the chain guide component. Depressions that have inclined surfaces and perpendicular surfaces are formed on the lateral surfaces of the control shaft according to the shift position, and the positions of the inclined surfaces in the depressions are formed on opposite sides from each other on the lateral surfaces. Power is supplied from the battery to the electric solenoid via a shift operating switch mounted on the handlebar or another suitable location, and the electric solenoid is actuated by this shift operating switch. When the electric solenoid is actuated and the rod tips engage with the depressions, the control shaft and the chain guide component are engaged immovably in either of the shift directions. The index mechanism serves to hold the chain guide component in the shift position after it has been moved, with the shift direction controlled by the control mechanism. This index mechanism is provided with a complementary conductor that is used to turn off the electric solenoid when the shift direction is held.

With this assisted shifting system, when the pedals are turned, the rotating members are rotated by the chain, and this rotation causes the control shaft to move back and forth in the shift direction. When the shift operating switch is then operated, the electric solenoid is actuated according to the switch, and the rod tips of the electric solenoid engage with one set of the depressions on the lateral surfaces of the control shaft. As a result, the chain guide component, including its pulley, moves in one shift direction along with the control shaft, and is held in the shift position by the index mechanism. When the chain guide component is held by the index mechanism, the electric solenoid retracts and the shift is complete.

With this assisted shifting system, the gears can be changed by actuating the electric solenoid through operation of the switch, so the rider does not need to exert as much effort to make a shift. However, since a battery is utilized as the power source (drive source), if a dry cell or other such disposable battery is used, it must be replaced every time it is used up. Thus, ensuring an available drive source drives up the cost. On the other hand, if a nickelcadmium cell or other such rechargeable battery is used, there is less cost entailed in ensuring a drive source, but charging takes a long time, and once the cell goes dead the assisted shifting system cannot be actuated until recharging is complete. In order to keep this from happening, a number of cells must be readied, taking into account the charging time and the service life of the charged cell, and these cells must always be kept in a fully charged state, which means that battery maintenance is inconvenient.

Another problem with electrically operated devices arises when the device is used in a wet environment. If muddy water or the like adheres to the electric solenoid, the complementary conductor, or other electrical parts during use in the rain or during use in a mountain bike race, there is the danger that defective insulation may cause the electric solenoid to malfunction. The environment in which this system can be used reliably is therefore limited.

U.S. Pat. No. 4,352,503 and EPO 120,571 disclose a derailleur that operates with compressed gas. A gas pumping mechanism is operated by the rotation of the wheel during riding. The pumping mechanism operates such that high speed riding produces a high gas pressure, and low speed riding produces a low gas pressure. The gas pressure is communicated to a piston which, in turn, is connected to a derailleur operating cable. The position of the derailleur thus is determined by the gas pressure generated by the pumping mechanism.

One drawback of this type of system is that the pumping mechanism creates a drag on the wheel or other rotating part during riding, thus increasing the effort that must be exerted by the rider. Furthermore, if the rider wants to select a particular gear, the rider must intuitively learn how much gas pressure is needed to select the gear, and then the rider must concentrate on operating the desired valve for the correct amount of time until the derailleur reaches the desired gear. Such a distraction can be very troublesome during a race or during other high performance riding.

SUMMARY OF THE INVENTION

The present invention is directed to a derailleur that can be used in a wide range of environments, is easy to maintain, and allows the rider to select gears quickly and reliably without distraction. In one embodiment of the present invention, a gas actuated derailleur for a bicycle includes a base member, a movable member supporting a chain guide, a coupling mechanism coupling the base member to the movable member so that the movable member moves relative to the base member, and an actuation mechanism responsive to compressed gas for causing the movable member to move relative to the base member. Since the derailleur is gas actuated, dampness will not cause malfunctioning of the derailleur, and the gas pressure can be maintained and restored quickly using a pump or compressor.

In a more specific embodiment, the actuation mechanism does not require varying gas pressures to move the derailleur. Instead, the actuation mechanism may be responsive to compressed gas having a substantially constant pressure for causing the movable member to move to any one of the desired gears. For example, the actuation mechanism may include first and second gas actuators. In this case the first gas actuator causes the movable member to move in a first direction relative to the base member, and the second gas actuator causes the movable member to move in an opposite direction relative to the base member. The position of the derailleur thus does not depend on a varying gas pressure being applied to the actuation mechanism.

In any of the embodiments, the actuation mechanism may include an indexing mechanism for setting and maintaining the movable member in a plurality of positions. As a result, the derailleur need not have a constant gas pressure applied to the derailleur to maintain the derailleur in the desired position. In an embodiment which includes first and second gas actuators, the indexing mechanism may include a control element having a first end coupled to the coupling mechanism, a takeup element for pulling and releasing a second end of the control element, and a ratchet and pawl mechanism coupled to the takeup element, to the first gas actuator and to the second gas actuator for driving the takeup element to a selected position and for maintaining the takeup element in the selected position. In this case the first gas actuator includes a first reciprocating element which reciprocates in response to successive application and removal of gas pressure, and the second gas actuator includes a second reciprocating element which reciprocates in response to successive application and removal of gas pressure. If desired, the ratchet and pawl mechanism may include a ratchet wheel coupled to the takeup element for movement therewith, a drive pawl coupled to the first reciprocating element for driving the ratchet wheel to the selected position, and a positioning pawl coupled to the second reciprocating element for selectively maintaining the ratchet wheel in and releasing the ratchet wheel from the selected position. In a very specific embodiment, the control element may be formed from a control cable, and the takeup element may be formed as a winding drum for alternately winding and unwinding the control cable. If desired, the indexing mechanism may be fitted within the base member to reduce the size of the derailleur.

In another embodiment of a gas actuated derailleur according to the present invention, the coupling mechanism comprises a first link member and a second link member, both of which are pivotably coupled to the base member and to the movable member to form a four-bar type coupling mechanism with the base member and the movable member. To prevent undesirable bending forces which tend to wear out the link pivot shafts and decrease efficiency, the control cable may approximately align with a centerline of the first link, and two return springs may be used to balance the return spring force among the components. More specifically, both return springs have a first end coupled to the base member and a second end coupled to the movable member. One return spring is positioned on one side of the first link, and the other return spring is positioned on an opposite side of the first link. Depending upon the derailleur design, the return springs may have different spring constants to fine tune the balanced forces on the derailleur components.

BRIEF DESCRIPTION OF THE DRAWINGS

FIG. 18A is a partial cut away view showing the indexing mechanism components used in a downshifting operation;

FIGS. 18B–18E illustrate the operation of the indexing mechanism during a downshifting operation;

FIG. 19A is a partial cut away view showing the indexing mechanism components used in an upshifting operation; and FIGS. 19B–19E illustrate the operation of the indexing mechanism during an upshifting operation.

DETAILED DESCRIPTION OF THE EMBODIMENTS

Figure 1:
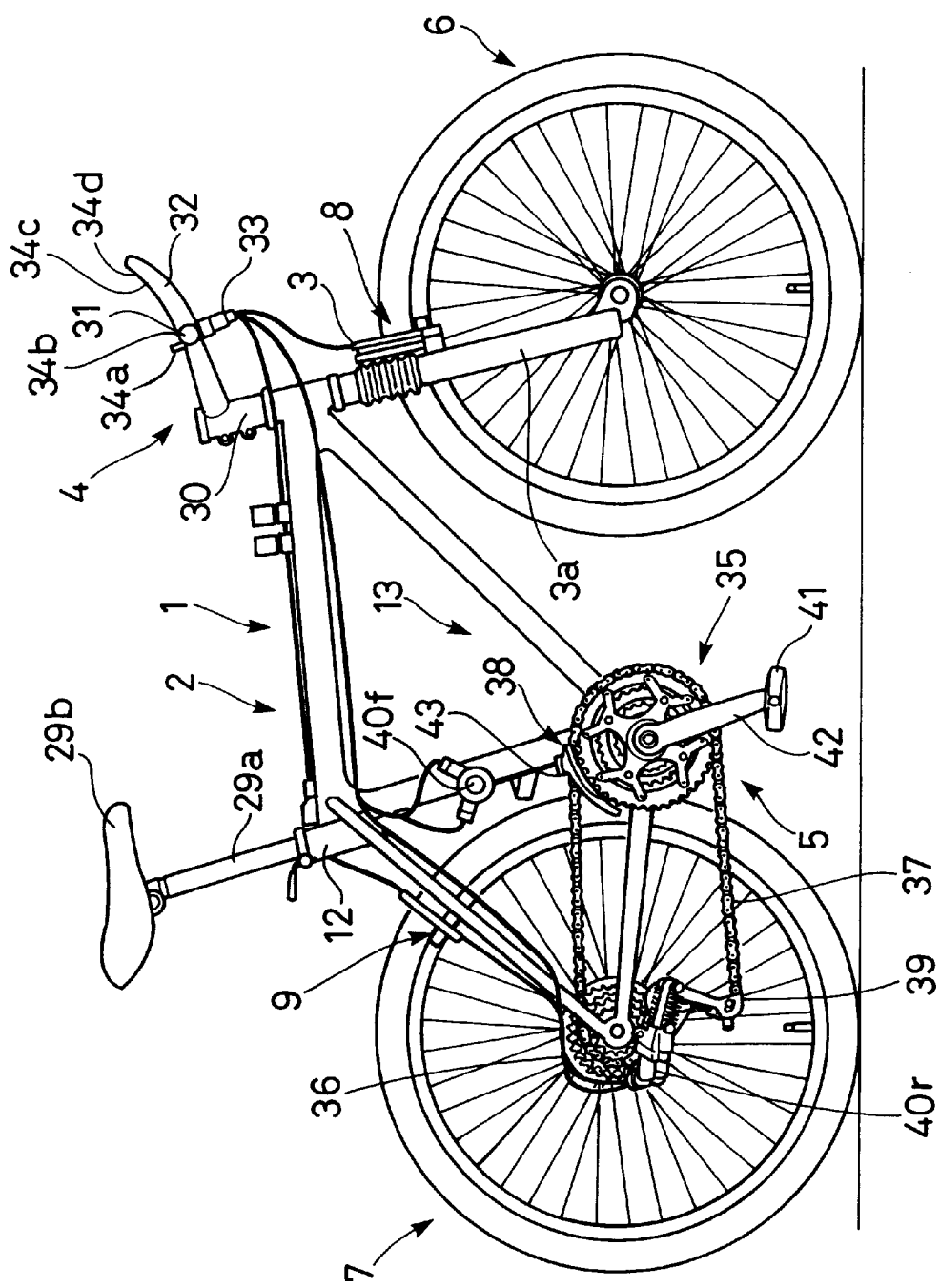
FIG. 1 is a side view of a bicycle which incorporates a particular embodiment of a gas actuated derailleur according to the present invention.

In FIG. 1, an MTB type of bicycle that employs an embodiment of the present invention is equipped with a diamond type of frame 1 that makes up the skeleton of the bicycle. The frame 1 has a frame body 2 composed of a front triangle and a rear triangle, and a front fork 3 that is rotatably supported around a diagonal vertical axis at the front part of the frame body 2 and that is equipped at its lower part with two pneumatic suspension pieces 3a. The bicycle is further equipped with a handlebar component 4 that is linked to the front fork 3, a drive component 5 that is attached to the lower part of the frame body 2 and that converts the pedaling force into drive force, a front wheel 6 that is detachably mounted onto the lower end of the front fork 3, a rear wheel 7 that is detachably mounted onto the rear portion of the frame body 2, and front and rear brake units 8 and 9.

Figure 2:
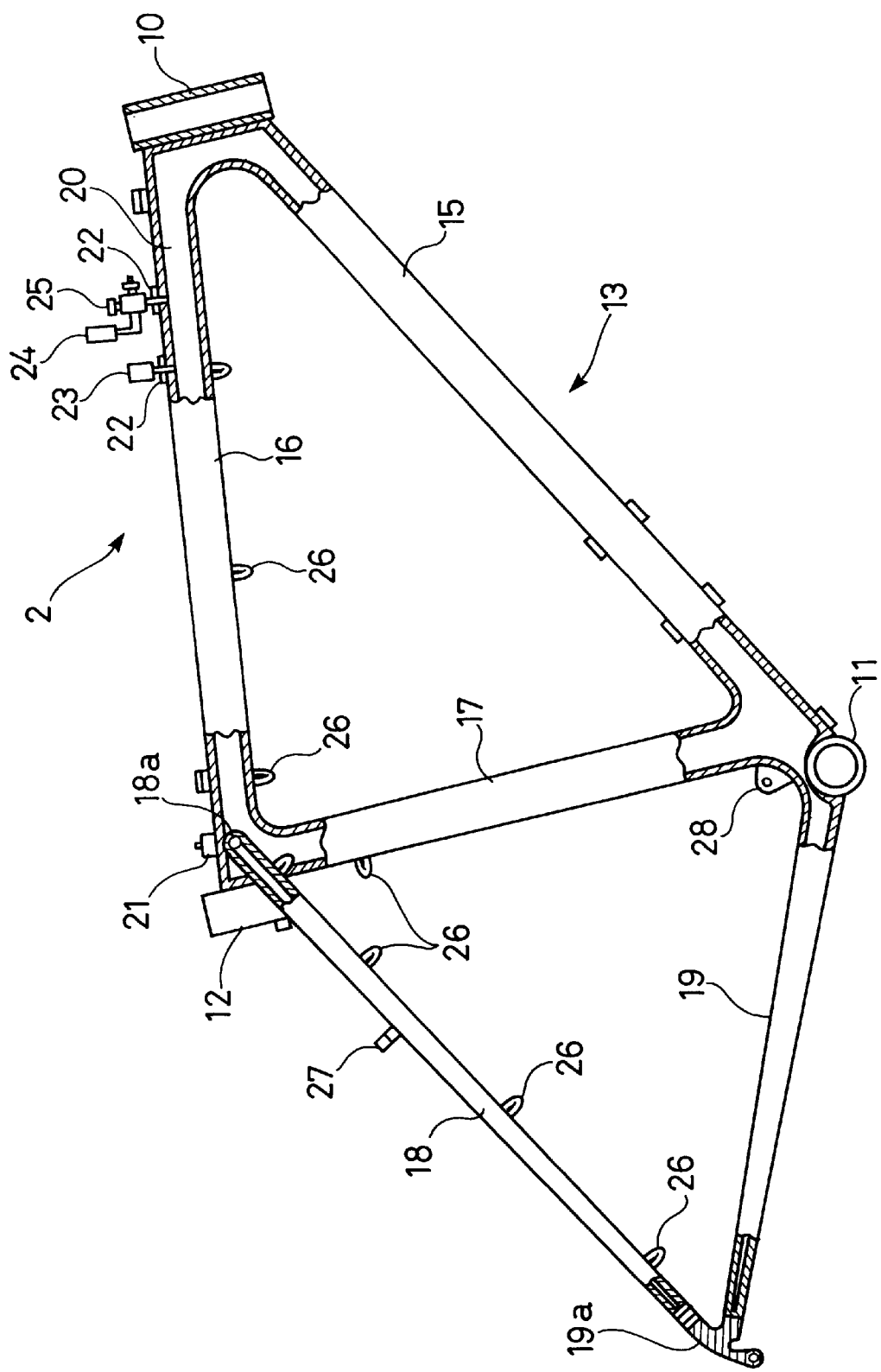
FIG. 2 is a partially cut away view of the bicycle frame shown in FIG. 1.

As shown in FIG. 2, the frame body 2 has a head component 10 that rotatably supports the front fork 3, a bottom bracket component 11 that is used to rotatably support the crank spindle (not shown), a saddle fixing component 12 that is used to fix the saddle (discussed below), and tube frame members 13 that link the above-mentioned components 10 through 12. These components are manufactured, for example, by the welding of metal tubes made of aluminum, chrome-moly steel, a titanium alloy, or another such material.

The tube frame members 13 comprise a down tube 15, a top tube 16, a seat tube 17, a seat stay 18, and a chain stay 19. The down tube 15 extends diagonally downward from the head component 10, and the bottom bracket component 11 is provided to the rear end of the down tube 15. The top tube 16 extends rearward from the head component 10 above the down tube 15. The seat tube 17 links the rear end of the top tube 16 and the rear end of the down tube 15. The cylindrical saddle fixing component 12 is welded and fixed to the rear portion of the upper end of the seat tube 17. As shown in FIG. 1, a saddle 29b is fixed to this saddle fixing component 12 such that the up and down position of a seat post 29a fixed to the upper end can be adjusted. The seat stay 18 extends in a two-pronged fashion diagonally downward from the rear end of the top tube 16. The chain stay 19 extends in a two-pronged fashion rearward from the bottom bracket component 11, and it is linked to the rear end of the seat stay 18 via a solid rear fork end 19a.

The interiors of tube frame members 13 are airtightly sealed off from the outside, but the spaces inside adjacent tubes communicate with each other. Accordingly, the frame forms a gas-filled component 20 capable of housing compressed gas of a maximum of about 10 kg/cm$^2$, for example. Here, the interior spaces of the down tube 15 and the top tube 16 are linked at the portion to the rear of the head component 10, and the interior space of the seat tube 17 communicates with those of the top tube 16 and the down tube 15 at the upper and lower ends of the seat tube 17, respectively. The interior spaces of the top tube 16 and the seat stay 18 communicate via a communication hole 18a formed at the rear of the top tube 16, and the interior spaces of the down tube 15 and the chain stay 19 communicate at the upper portion of the bottom bracket component 11.

The upper surface of the top tube 16 is provided with a gas filler opening 21 that is used to fill the gas-filled component 20 with compressed gas, and with two gas supply openings 22 that are used to supply the compressed gas housed in the interior to the outside. An American type of tire valve, for example is mounted to the gas filler opening 21, and the structure is such that compressed air can be easily introduced by means of a bicycle air pump or an automotive air pump. The two gas supply openings 22 are set up in parallel in the longitudinal direction at the front portion of the top tube 16. A pressure gauge 23 that is used to display the amount of remaining air as well as the original pressure inside the gas-filled component 20 is installed at one of the gas supply openings 22, and a pressure regulator 25 equipped with a pressure gauge 24 is installed at the other gas supply opening 22.

Ring-like air tube supports 26 are provided at suitable intervals from the top tube 16 to the lower portion of the seat stay 18. Further, a washer 27 that is used to mount the rear brake unit 9 is formed midway along the seat stay 18, and a bracket 28 that is used to mount the front derailleur (discussed below) is formed at the rear portion of the lower end of the seat tube 17.

As shown in FIG. 1, a handlebar stem 30 that makes up part of the handlebar component 4 is fixed to the upper part of the front fork 3. A handlebar 31 that extends to the left and right is fixed to the upper end of the handlebar stem 30. End bars 32 are mounted to both ends of the handlebar 31. Grips (not shown) are installed on the inner side of the end bars 32, and brake levers 33 are installed on the inner side of the grips. A pair of shift valves 34a and 34b that are used to shift a front derailleur 38 and a rear derailleur 39, respectively, are attached on the inner side of the brake levers 33. These shift valves 34a and 34b are manually operated valves that are normally closed and each have a lever, and they have three ports, namely, an inlet port, an outlet port, and an exhaust port. The shift valves 34a and 34b pass air from the inlet port to the outlet port in an amount corresponding to the operation of the levers, and when the levers are not operated, air is discharged from the outlet portion to the exhaust port.

Another pair of shift valves 34c and 34d just like the shift valves 34a and 34b are also provided at the distal ends of the end bars 32 at both ends. The shift valves 34a and 34c are down-shift valves, while the shift valves 34b and 34d are up-shift valves. Here, "down-shift" refers to a shift going from a smaller to a larger gear, while "up-shift" refers to a shift going from a larger to a smaller gear. As a result, when the rider is gripping the end bars 32, such as on an uphill stretch, the front derailleur 38 and rear derailleur 39 can be shifted without the rider taking her hands from the end bars 32.

The drive component 5 has a chainwheel crank component 35, a hub cog component 36 that is attached to the free hub of the rear wheel 7, a chain 37 that loops between the chainwheel crank component 35 and the hub cog component 36, a front derailleur 38 and a rear derailleur 39 used for gear change, and front and rear shift actuation mechanisms 40f and 40r. The front shift actuation mechanism 40f is linked to the front derailleur 38 via a control cable 48 (FIG. 4), and it is used to move the front derailleur 38 back and forth in the crank spindle direction one gear at a time. The rear shift actuation mechanism 40r is linked to the rear derailleur 39 via a control cable 49 (FIG. 3), and it is used to move the rear derailleur 39 back and forth in the hub axle direction one gear at a time.

The chainwheel crank component 35 has a right chainwheel crank 42 and a left crank (not shown), to the distal ends of which are attached pedals 41. The right chainwheel crank 42 and the left crank are linked by the crank spindle. The crank spindle is rotatably supported by a bottom bracket component 11. Three chainwheels, for example, with different numbers of teeth are mounted on the right chainwheel crank 42 in a row in the crank spindle direction. Eight hub cogs, for example, with different numbers of teeth are mounted on the hub cog component 36 in a row in the crank spindle direction.

Figure 4:
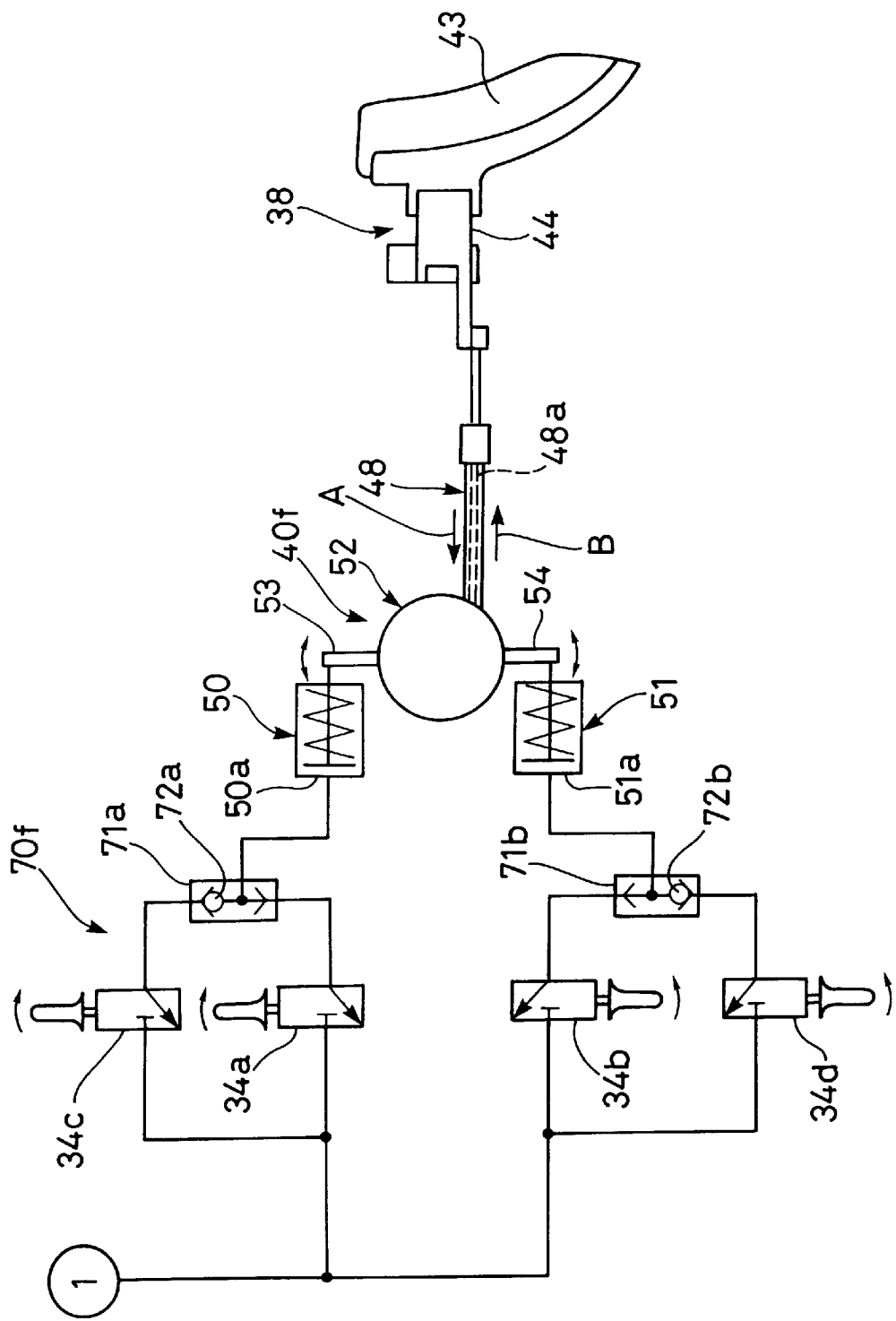
FIG. 4 is a schematic diagram of a front derailleur shift mechanism used with the bicycle shown in FIG. 1.

As shown in FIG. 4, the front derailleur 38 has a chain guide component 43 that is composed of a pair of wing plates and that is used to guide the chain 37 in the axial direction of the chainwheels, and a linking mechanism 44 that is used to support the chain guide component 43 movably in the chainwheel axial direction with respect to the frame 1. The linking mechanism 44 is fixed to the seat tube 17, and it is biased by a spring (not shown) so that it moves the chain guide component 43 to the up-shift side.

Figure 3:
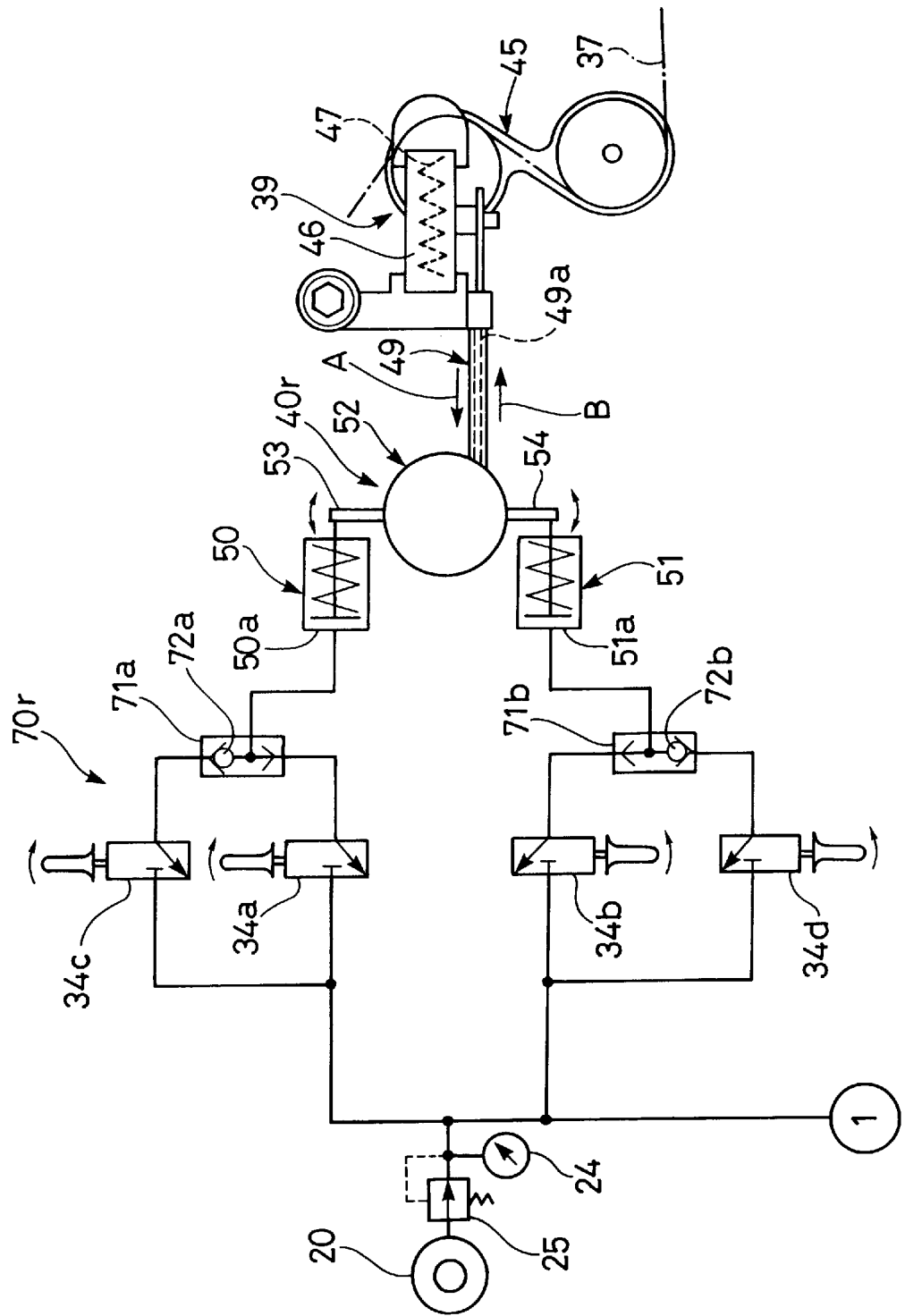
FIG. 3 is a schematic diagram of a rear derailleur shift mechanism used with the bicycle shown in FIG. 1.

As shown in FIG. 3, the rear derailleur 39 has a chain guide component 45 having two pulleys that guide the chain 37 in the axial direction of the chainwheels while applying tension to the chain 37, and a linking mechanism 46 that is used to support the chain guide component 45 movably in the chainwheel axial direction with respect to the frame 1. The linking mechanism 46 is screwed to a rear fork end 19a, and it is biased by a spring 47 so that it moves the chain guide component 45 to the up-shift side.

The shift actuation mechanisms 40f and 40r have the same structure, and the shift actuation mechanism 40r will be used as an example in the description here. The shift actuation mechanism 40r is an air-actuated type, and, as shown in FIG. 3, it has two air cylinders (actuators) 50 and 51, and an actuation component (actuation mechanism) 52 that is actuated by the air cylinders 50 and 51 and that is used to actuate the rear derailleur 39. The air cylinders 50 and 51 are single-acting cylinders each having a return spring in its interior. When compressed gas is supplied to the supply openings 50a and 51a, these cylinders move forward a specific stroke, and then return to their starting place when the supply is removed.

As shown in FIGS. 5 through 9, the actuation component 52 has a positioning arm 53 that is linked to and oscillates on the air cylinder 50, a release arm 54 that is linked to and oscillates on the air cylinder 51, and a cable winder component 55 and cable play-out component 56 that are housed within a case 60. The cable winder component 55 is rotated by one gear in one direction by the oscillation of the positioning arm 53, and it is used to wind the inner cable 49a of the control cable 49. The cable play-out component 56 is rotated by one gear in the other direction by the oscillation of the release arm 54, and it is used to play out the inner cable 49a of the control cable 49.

The cable winder component 55 has a feed ratchet 57, a positioning ratchet 58 that rotates integrally with the feed ratchet 57, and a cable winder 59 that rotates integrally with the positioning ratchet 58. These ratchets 57 and 58 and the cable winder 59 are rotatably and integrally supported by a rotating shaft 61 that is fixed to the case 60, and they are energized in the counterclockwise direction in FIGS. 6 and 8 (the cable play-out direction) by a spiral spring 62 that is fixed at one end to the case 60.

Figure 6A:
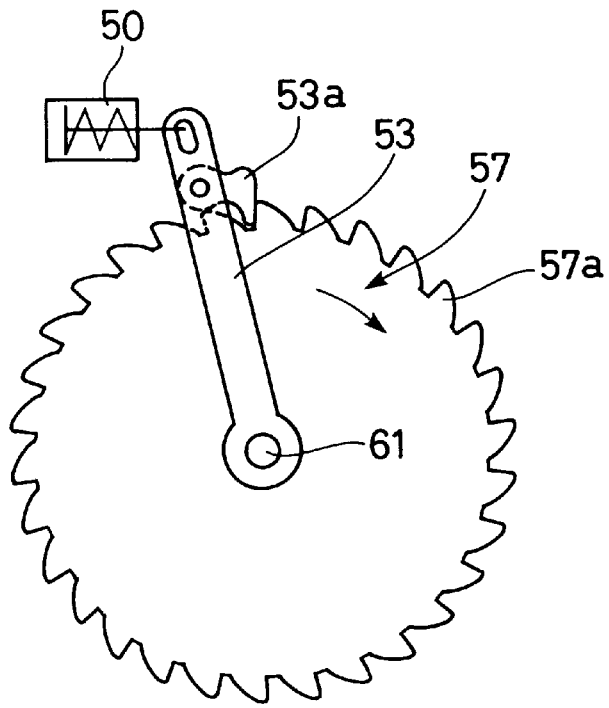
FIGS. 6A and 6B are side views illustrating the operation of a cable winding feed ratchet shown in FIG. 5.
Figure 6B:
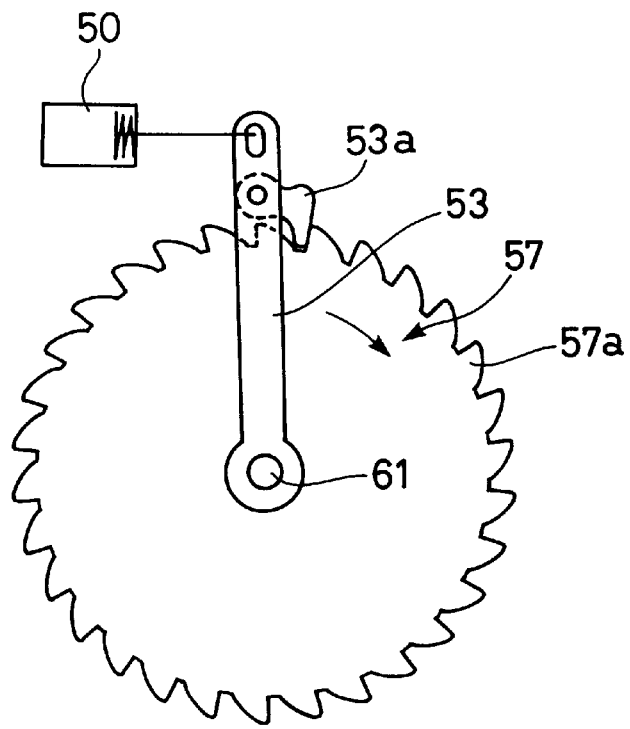

As shown in FIG. 6A, 30 ratchet teeth 57a, for example, are formed at equal intervals around the outer periphery of the feed ratchet 57. A feed pawl 53a that engages with these ratchet teeth 57a is oscillatably provided to the positioning arm 53. This feed pawl 53a is energized toward the ratchet teeth 57a. Here, when the air cylinder 50 is actuated one stroke, as shown in FIG. 6B, the positioning arm 53 swings, the feed pawl 53a rotates the feed ratchet 57 clockwise by one tooth of the ratchet teeth 57a, and the cable winder 59 is rotated by 12 degrees.

Figure 8:
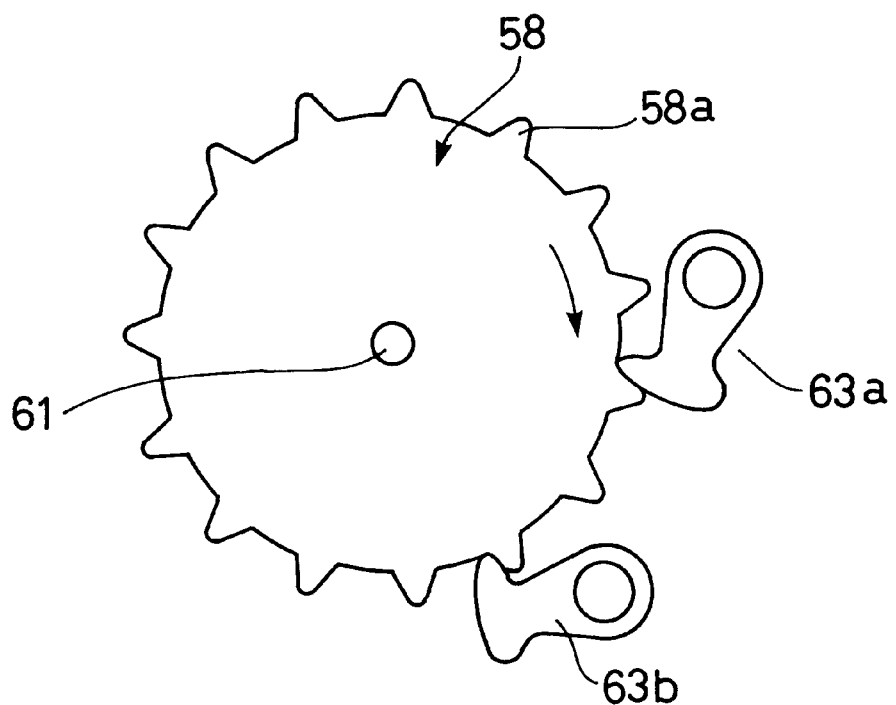
FIG. 8 is a side view illustrating the operation of a positioning ratchet shown in FIG. 5.

As shown in FIG. 8, 15 ratchet teeth 58a, for example, are formed at equal intervals around the outer periphery of the positioning ratchet 58. Positioning pawls 63a and 63b that engage with these ratchet teeth 58a are arranged at intervals of 60 degrees in the peripheral direction on the outside of the positioning ratchet 58. These positioning pawls 63a and 63b are oscillatably supported in the case 60, and they are biased toward the ratchet teeth 58a. The distal ends of these positioning pawls 63a and 63b engage with the ratchet teeth 58a and hold the rotational position of the positioning ratchet 58. One of the positioning pawls 63a and 63b holds the positioning ratchet 58 while the other does not. In other words, the positioning pawls 63a and 63b hold the positioning ratchet 58 alternately. The positioning pawls 63a and 63b also extend to the outer side of a release cam (discussed below in conjunction with FIG. 9) on either side of the feed ratchet 57.

Figure 5:
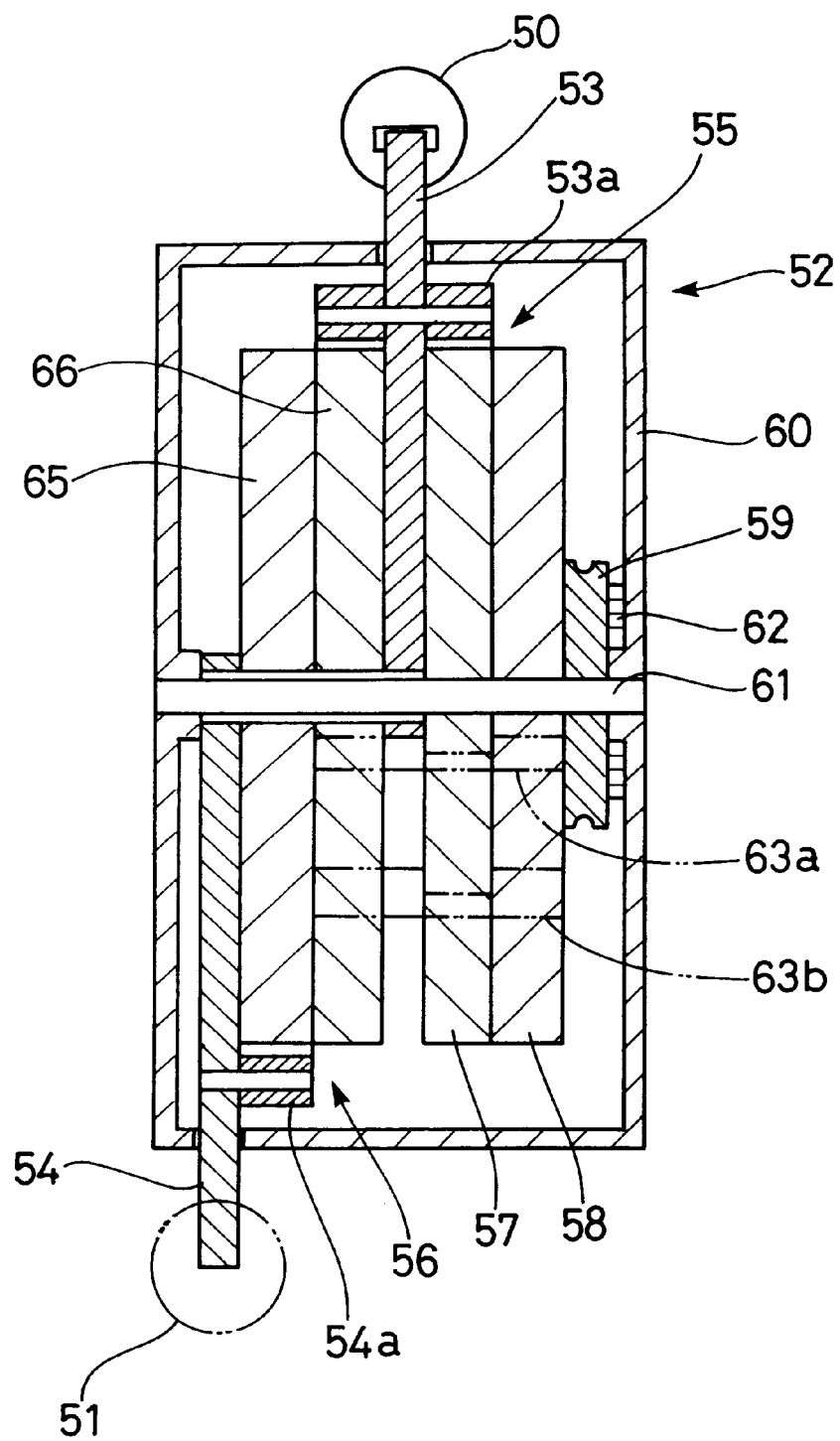
FIG. 5 is a cross sectional view of a particular embodiment of an actuation mechanism that may be used with the front and/or rear shift mechanism according to the present invention.
Figure 7A:
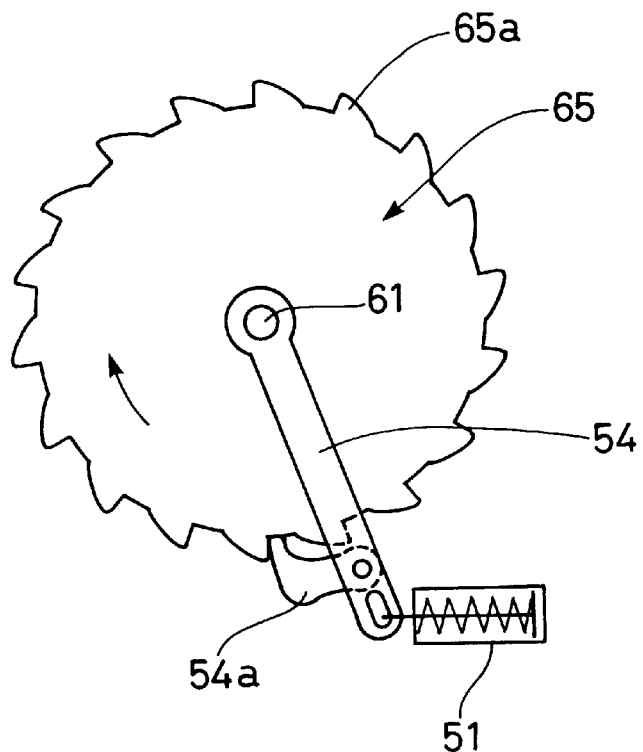
FIGS. 7A and 7B are side views illustrating the operation of a cable releasing feed ratchet shown in FIG. 5.
Figure 7B:
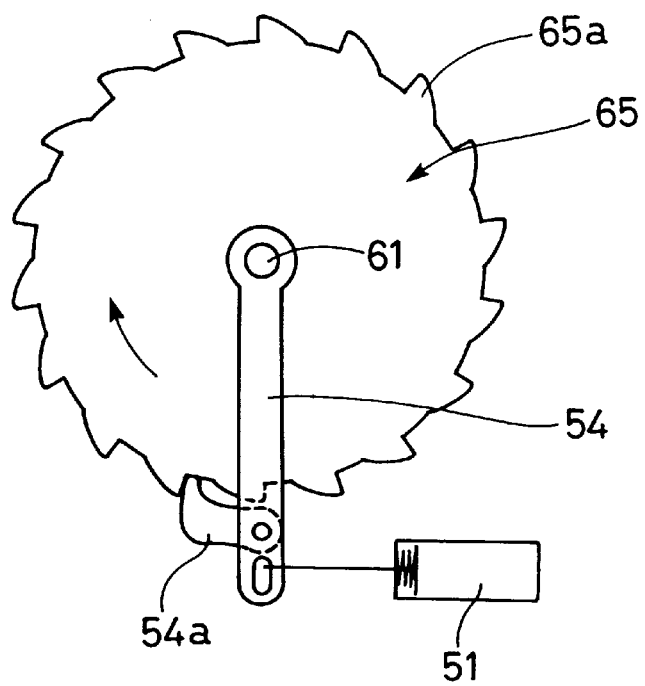

As shown in FIG. 5, the cable play-out component 56 has a feed ratchet 65 and a release cam 66 that rotates integrally with the feed ratchet 65. The feed ratchet 65 and cam 66 are rotatably and integrally supported by the rotating shaft 61 that is fixed to the case 60. As shown in FIG. 7A, 18 ratchet teeth 65a, for example, are formed at equal intervals around the outer periphery of the feed ratchet 65. A feed pawl 54a that engages with these ratchet teeth 65a is oscillatably provided to the release arm 54. This feed pawl 54a is biased toward the ratchet teeth 65a. Here, when the air cylinder 51 is actuated one stroke, as shown in FIG. 7B, the release arm 54 swings, the feed pawl 54a rotates the feed ratchet 65 clockwise by one tooth of the ratchet teeth 65a, and the release cam 66 is rotated by 20 degrees.

Figure 9:
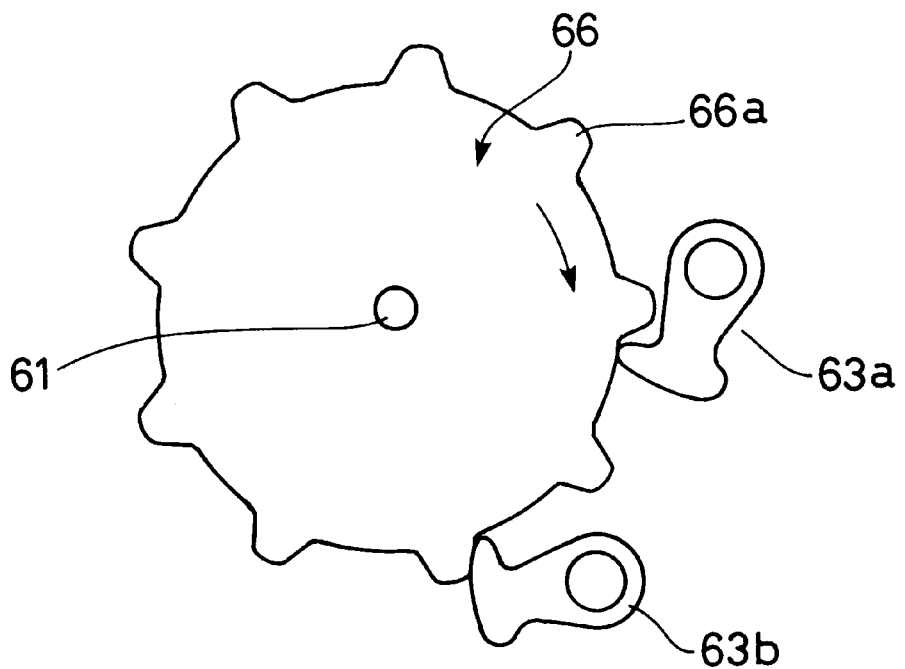
FIG. 9 is a side view illustrating the operation of a release cam shown in FIG. 5.

As shown in FIG. 9, nine cam teeth 66a, for example, are formed at equal intervals around the outer periphery of the release cam 66. One of the positioning pawls 63a and 63b, that is, the one that holds the positioning ratchet 58, is in contact with these cam teeth 66a. As a result, when the release cam 66 is rotated, the positioning pawl 63a or 63b that is doing the holding swings to the outside, and the holding of the positioning ratchet 58 is immediately released. The feed pawl 53a also extends to the outer periphery of the release cam 66, and it swings outward simultaneously with the positioning pawl 63a or 63b as a result of the rotation of the release cam 66. When these pawls swing, the positioning ratchet 58 immediately rotates in the cable play-out direction as a result of the biasing force of the spiral spring 62. Accordingly, there is an instantaneous gear shift in the cable play-out direction.

As shown in FIGS. 3 and 4, air control components 70f and 70r are arranged between the air cylinders 50 and 51, respectively, and the gas-filled component 20. The air control components 70f and 70r have the same structure, so the air control component 70r will be used as an example. The air control component 70r has the four shift valves 34a through 34d, mentioned above, and shuttle valves 71a and 71b that are jointly connected to the outlet port of the shift valves 34a and 34c and to the outlet port of the shift valves 34b and 34d, respectively. The four shift valves 34a through 34d are three-port manually operated valves that are normally closed and each have a control lever, as mentioned above. When the levers are operated, the inlet port and the outlet port communicate with each other, and air passes only through this part. When the levers are released and return to their starting places, the outlet port and the exhaust port communicate with each other, and the air in the tubing beyond the outlet port is released.

The inlet ports of the shift valves 34b and 34d are jointly connected to the regulator 25, and the exhaust ports are open to the outside. The shuttle valve 71a is provided so that when one of the shift valves 34a and 34c (or shift valves 34b and 34d) is operated, air will not leak from the other shift valve 34c or 34a, and is provided in order to select which of the shift valves 34a and 34c (or shift valves 34b and 34d) will be operated. The outlet ports of the shuttle valves 71a and 71b are connected to the supply openings 50a and 51a, respectively. The various valves and cylinders are connected by air tubes.

The shift operation of the bicycle rear derailleur 39 using the compressed air housed in the gas-filled component 20 will now be described. The shifting procedure is the same for the front derailleur 38, so the description thereof will be omitted.

Before the bicycle is used, the gas-filled component 20 is filled with compressed air. At this time, for example, an adapter for use with American tire valves that is connected to a compressor for putting air in an automobile tire at a gas station or the like is mounted on the gas filler opening 21. The gas-filled component 20 is filled with about 5 to 8 kg/cm$^2$ of compressed air, for example. The supply pressure is then adjusted to about 2 kg/cm$^2$ with the regulator 25. When the pressure reading on the pressure gauge 23 drops to 2 kg/cm$^2$, for instance, or to the same level as the supply pressure, the compressed air will not be output from the gas-filled component 20. Therefore, in this case a manual bicycle pump or a compressor must be used to refill the gas-filled component 20 with more compressed air. However, this air filling takes only a short time, ranging from a few seconds to a few minutes.

The lever of the shift valve 34a or 34c is operated once when the rear derailleur 39 is to be shifted from a high gear to a lower gear (down shift). When the shift valve 34a or 34c is operated once, while the lever is being operated, the compressed air that has been adjusted to about 2 kg/cm$^2$ by the regulator 25 is supplied to the air cylinder 50 via the shift valve 34a or 34c and the shuttle valve 71a. At this point, the valve body 72a inside the shuttle valve 71a is pushed by the compressed air to the side opposite the air supply side so the compressed air cannot back-flow to the outlet port of the shift valve 34c or 34a on the opposite side.

When air is supplied to the air cylinder 50, the cylinder rod of the air cylinder 50 advances by the specified stroke and swings the positioning arm 53 by a specified angle. As shown in FIG. 6, the feed pawl 53a is engaged with the ratchet teeth 57a, so when the positioning arm 53 swings by the specified angle, the feed ratchet 57 rotates 12 degrees clockwise, for example. This is accompanied by the integral rotation of the positioning ratchet 58 and the cable winder 59 as well. When the positioning ratchet 58 has rotated 12 degrees, if it was being held by the positioning pawl 63a prior to rotation, this hold will be released, and it will instead be held by the positioning pawl 63b. This 12-degree rotation pulls the inner cable 49a of the control cable 49 in the direction of arrow A in FIG. 3, and the rear derailleur 39 moves one gear lower. When the lever is then released, the outlet port and the exhaust port communicate with each other, the pressure of the air inside the air cylinder 50 is released, and the cylinder rod is returned by a spring to its starting place. As a result, the positioning arm 53 also returns to its home position. At this point, even though the positioning arm 53 returns, the positioning ratchet 58 is held by the positioning pawl 63a or 63b, so the cable winder 59 is held in its post-rotational position.

Meanwhile, the lever of the shift valve 34b or 34d is operated once when the rear derailleur 39 is to be shifted from a low gear to a higher gear (up shift). When the shift valve 34b or 34d is operated once, while the lever is being operated, the compressed air is supplied to the air cylinder 51 via the shift valve 34b or 34d and the shuttle valve 71b. At this point, the valve body 72b inside the shuttle valve 71b is pushed by the compressed air to the side opposite the air supply side so the compressed air cannot back-flow to the outlet port of the shift valve 34d or 34b on the opposite side.

Figure 10A:
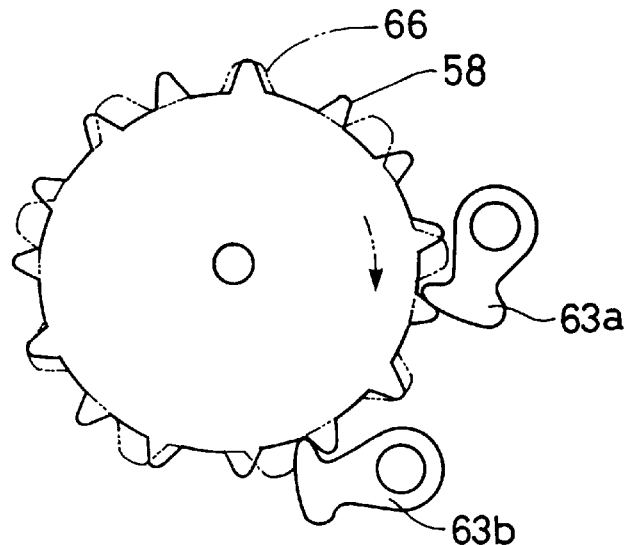
FIGS. 10A–10C are side views illustrating the operation of the positioning ratchet and the release cam during a cable release operation.
Figure 10B:
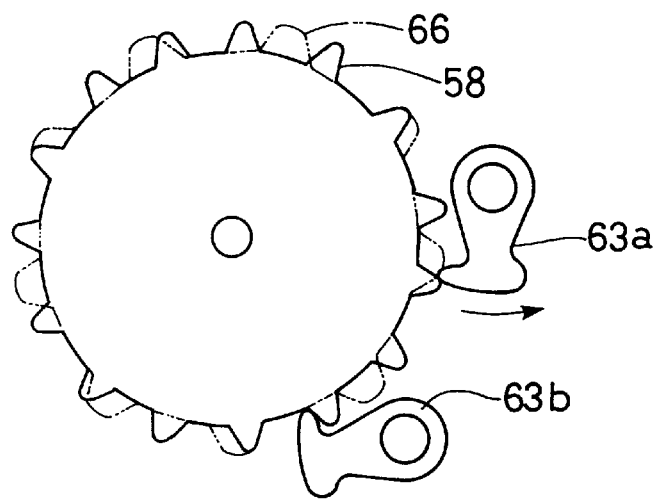
Figure 10C:
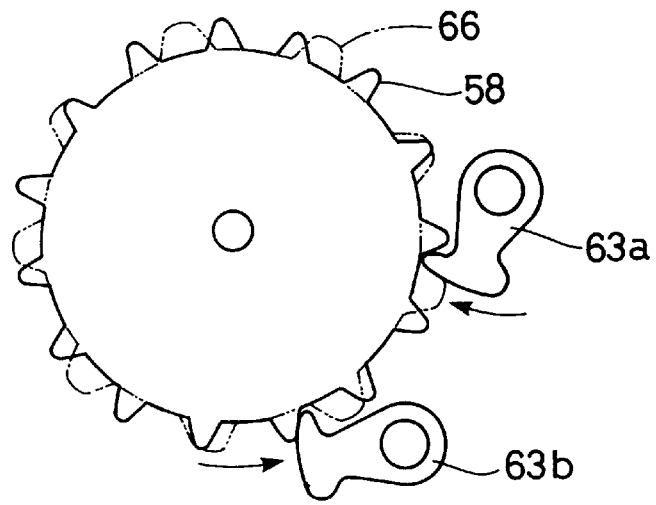

When air is supplied to the air cylinder 51, the cylinder rod of the air cylinder 51 advances by the specified stroke and swings the release arm 54 by a specified angle. As shown in FIG. 7, the feed pawl 54a is engaged with the ratchet teeth 65a, so the feed ratchet 65 rotates 20 degrees clockwise, for example. As a result, the release cam 66 also rotates integrally. As shown in FIG. 10A, when the release cam 66 has rotated 20 degrees, if the positioning ratchet 58 was being held by the positioning pawl 63a prior to rotation, the release cam 66 will kick the positioning pawl 63a and cause it to swing to the outside, and the hold of the positioning ratchet 58 by the positioning pawl 63a will be released (FIG. 10B). The feed pawl 53a is also made by the release cam 66 to swing to the outside, and the feed pawl 53a is also released. As a result, when these pawls swing, the positioning ratchet 58 immediately rotates backward (counterclockwise in FIG. 10) because of the energizing force of the spiral spring 62. As shown in FIG. 10C, when the positioning pawl 63b engages with the ratchet teeth 58a, the underside positioning ratchet 58 is held by the positioning pawl 63b. As a result, the cable winder 59 turns backward by one gear, the inner cable 49a of the control cable 49 is played out in the direction of arrow B in FIG. 3, and the rear derailleur 39 moves one gear higher.

Since the derailleurs 38 and 39 are actuated by pneumatic shift actuation mechanisms 40f and 40r via the control cable 49, there are no limitations on location where the shift actuation mechanisms 40f and 40r are attached. Also, since a shift is made by actuating the actuation mechanism by means of actuators (air cylinders 50 and 51) that are actuated by compressed air, the drive source can be maintained more easily than when using an electric actuator in which a battery serves as the power source. Furthermore, there is little danger of malfunction should the air cylinders 50 and 51 or the actuation component 52 be splashed with water during riding in the rain or on muddy roads.

Figure 11:
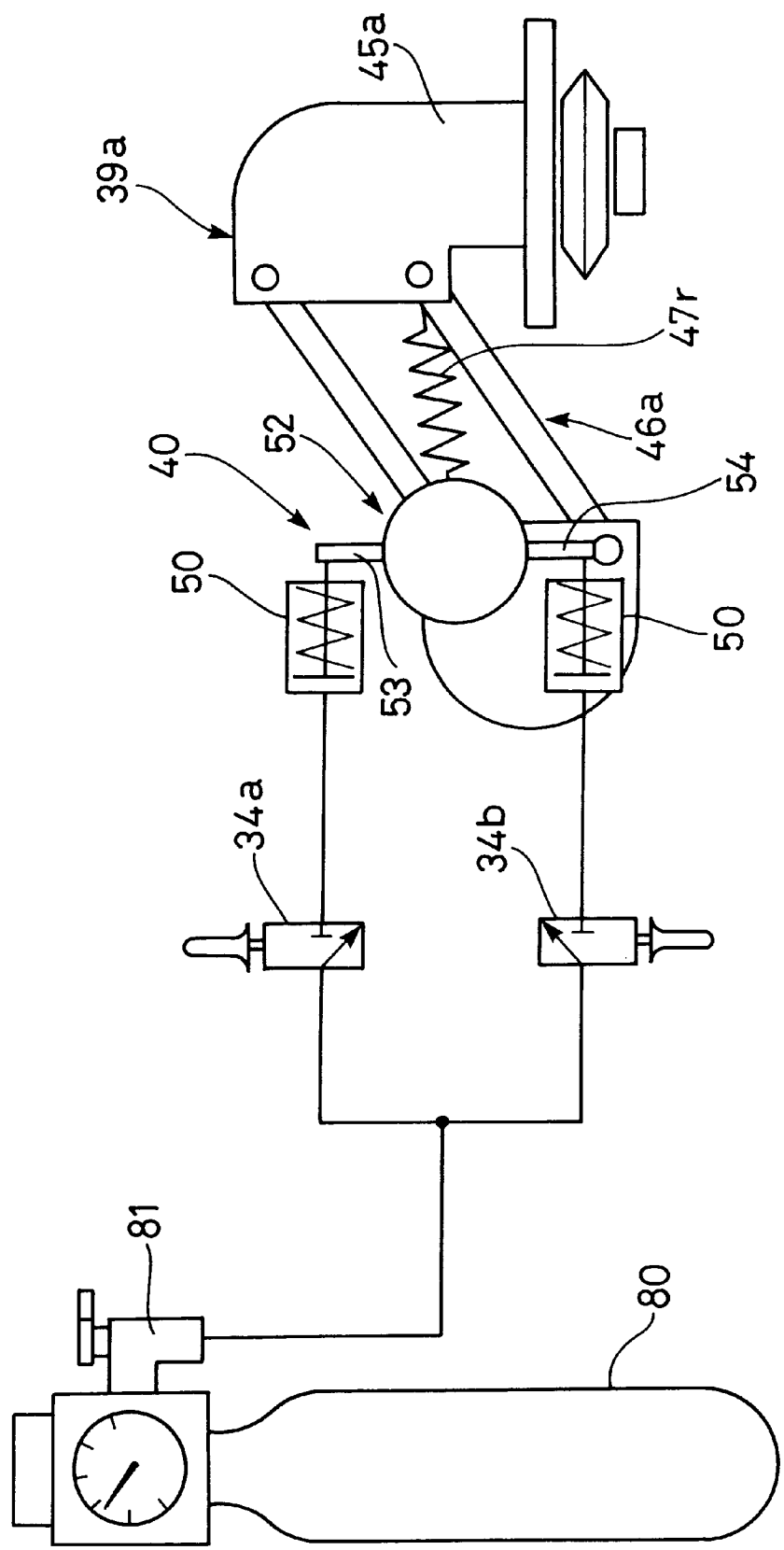
FIG. 11 is a schematic diagram of an alternative embodiment of a gas actuated shifting mechanism according to the present invention.

FIG. 11 is a schematic diagram of an alternative embodiment of a gas actuated shifting mechanism according to the present invention. As shown in FIG. 11, a derailleur 39a may also be actuated directly by the actuation component 52, rather than a structure in which the rear derailleur 39 is actuated via the control cable 49. In this case, a high-pressure gas cylinder 80 equipped with a regulator 81 is used as the compressed air source instead of using the frame body 2 as the compressed air source. The high-pressure gas cylinder 80 is, for example, filled with liquefied carbon dioxide at a pressure of about 60 kg/cm$^2$. The rear derailleur 39a has a chain guide component 45a, and a linking mechanism 46a that is used to support the chain guide component 45a movably in the chainwheel axial direction with respect to the frame. The linking mechanism 46a is biased by a spring 47r so that it moves to the up-shift side. The link shafts of the linking mechanism 46a rotate while being positioned by the actuation component 52. This results in the linking mechanism 46a causing the chain guide component 45a to move by one gear at a time in the hub cog axial direction. Attaching the actuation component 52 directly to the rear derailleur 39a eliminates the need for adjustment of the elongation of the control cable, and it facilitates shift adjustment.

Figure 12:
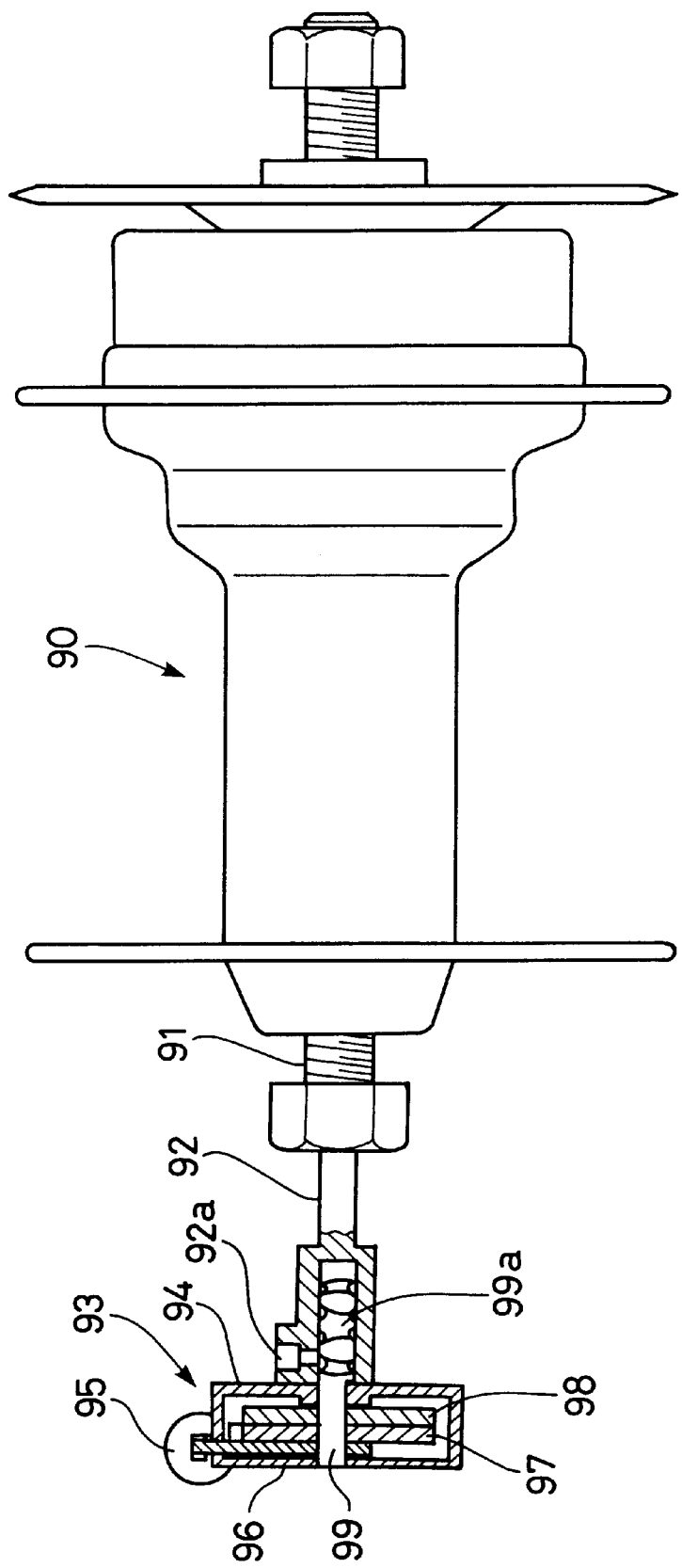
FIG. 12 is a partially cut away view of another alternative embodiment of a gas actuated shifting mechanism according to the present invention.

FIG. 12 is a partially cut away view of another alternative embodiment of a gas actuated shifting mechanism according to the present invention. As shown in FIG. 12, the present invention can also be applied to an internal type of shift mechanism instead of an external shift mechanism. In this case, a rear wheel hub 90 which houses an internal shift mechanism can be shifted between four gears by means of an actuating shaft 92 that moves back and forth in the axial direction inside a hub axle 91. This actuating shaft 92 is made to move back and forth by a shift actuation mechanism 93. The shift actuation mechanism 93 has an actuation component 94 and an air cylinder 95 that is used to actuate the actuation component 94. The actuation component 94 has a positioning arm 96 that is linked to and oscillates on the air cylinder 95, a feed ratchet 97 that is rotated in one direction one gear at a time by the oscillation of the positioning arm 96, a positioning ratchet 98 that rotates integrally with the feed ratchet 97, and a rotating shaft 99 that fixes these components. The structures of the positioning arm 96, the feed ratchet 97, and the positioning ratchet 98 are the same as those discussed above, and their description will be omitted here.

The rotating shaft 99 is fitted into the actuating shaft 92, and it supports the actuating shaft 92 such that it can move in the axial direction. Intersecting spiral grooves 99a are formed around the outer peripheral surface of the actuating shaft 92 fitting portion of the rotating shaft 99, and an engagement member 92a that engages with the spiral groove 99a is mounted on the end of the actuating shaft 92. As a result of this engagement member 92a being engaged with the spiral groove 99a, when the rotating shaft 99 rotates in one direction by one gear, the actuating shaft 92 moves by one gear in the axial direction. When the actuating shaft 92 has moved by four gears, it reaches the movement end, after which it returns in the opposite direction one gear at a time. In other words, when the rotating shaft 99 is rotated in one direction, the actuating shaft 92 moves back and forth three times and shifts the shift mechanism. In this case, the structure of the shift actuation mechanism can be simpler since up and down shifts can be made with a single air cylinder. If desired, the shift mechanism may be actuated from the actuation component via a control cable, and a shift may be made by using two air cylinders to perform positioning and position release.

Figure 14:
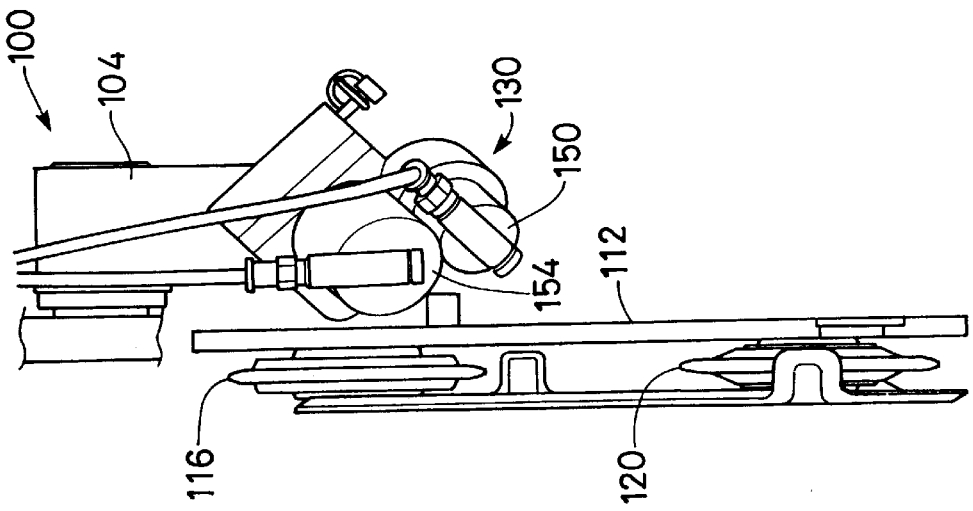
FIG. 14 is a rear view of the gas actuated shifting mechanism shown in FIG. 13.
Figure 13:
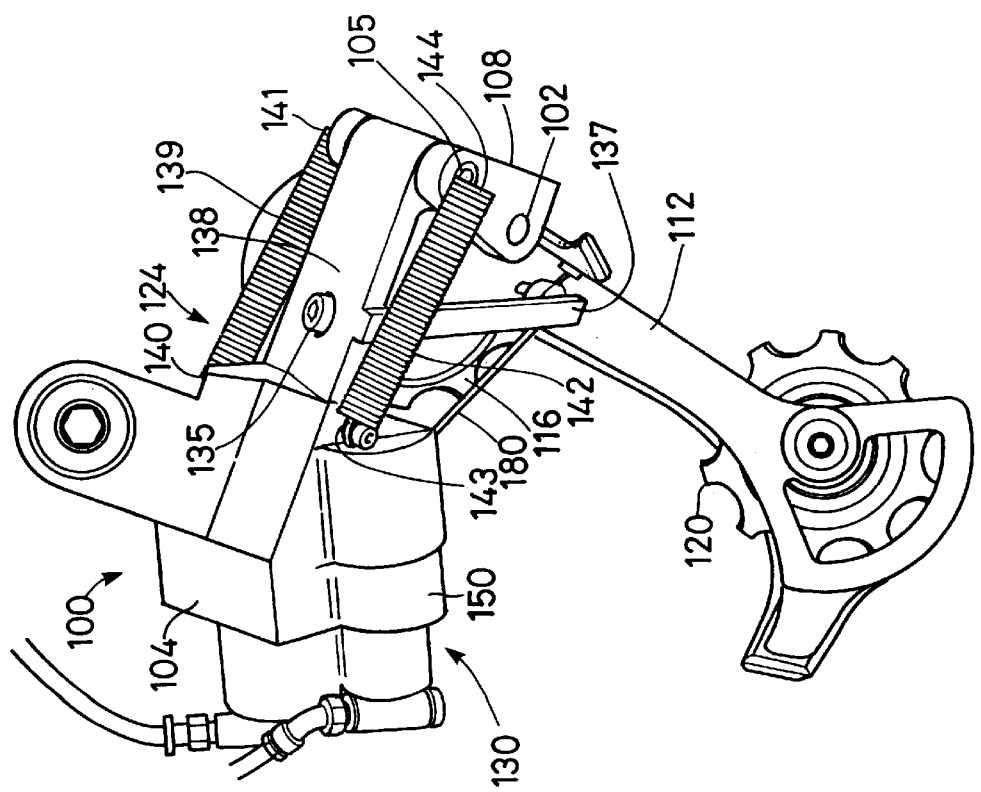
FIG. 13 i a side view of another alternative embodiment of a gas actuated shifting mechanism according to the present invention.
Figure 15:
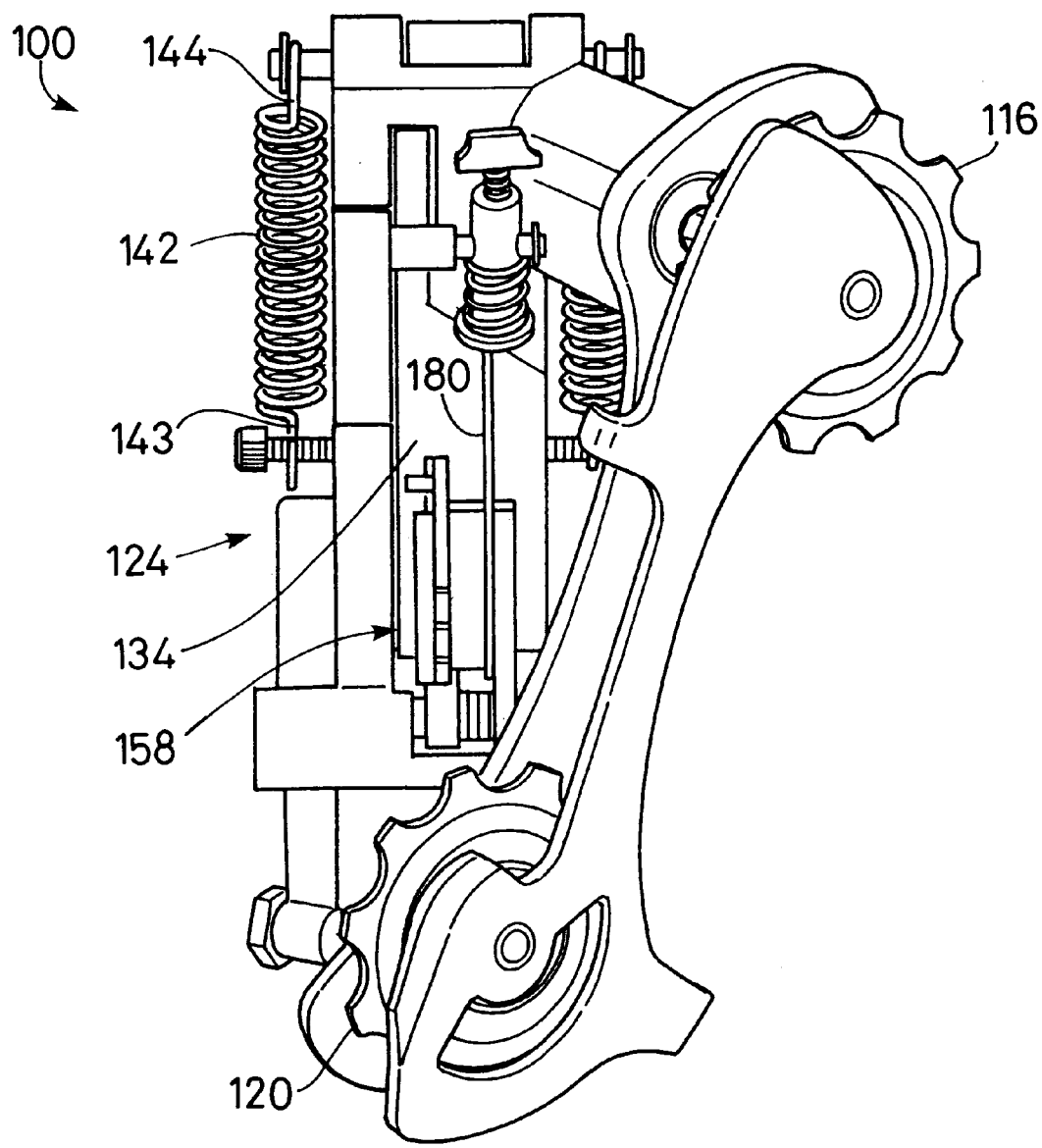
FIG. 15 is a bottom view of the gas actuated shifting mechanism shown in FIG. 13.

FIGS. 13–15 are side, rear and bottom views, respectively, of another alternative embodiment of a gas actuated shifting mechanism in the form of a rear derailleur 100 according to the present invention. Derailleur 100 includes a base member 104, a movable member 108 supporting a chain guide 112 having a guide pulley 116 and a tension pulley 120, a coupling mechanism 124 coupling the base member 104 to the movable member 108 so that the movable member 108 moves relative to the base member 104, and an actuation mechanism 130 responsive to compressed gas for causing the movable member 108 to move relative to the base member 104. Coupling mechanism 124 comprises a first link member 134 (FIG. 15) pivotably coupled to the base member 104 through a pivot pin 101 (FIG. 16) and to the movable member 108 through a pivot pin 102, and a second link member 138 pivotably coupled to the base member 104 through a pivot pin 103 and bearings 230 (FIG. 17) and to the movable member 108 through a pivot pin 105. An actuating arm 137 extends approximately perpendicular to second link member 138, and a low-side adjustment screw 135 is mounted to second link 138. First link member 134 and second link member 138 form a four-bar type coupling mechanism with base member 104 and movable member 108. A first return spring 139 located on one side of link 138 has a first end 140 coupled to the base member 104 and a second end 141 coupled to movable member 108, and a second return spring 142 located on the opposite side of link 138 has a first end 143 coupled to the base member 104 and a second end 144 coupled to the movable member 108. Return springs 139 and 142 bias movable member 108 in the upshifting direction, typically laterally outwardly from the rear wheel of the bicycle.

Actuation mechanism 130 includes an upshift gas actuator 150, a downshift gas actuator 154, and an indexing mechanism 158. As with air cylinders 50 and 51 shown in FIG. 3, upshift gas actuator 150 and downshift gas actuator 154 are single-acting actuators each having an internal return spring. Upshift gas actuator 150 includes a first reciprocating element 162 (FIG. 19A) which reciprocates in response to successive application and removal of gas pressure. More specifically, when compressed gas is supplied to upshift gas actuator 150, reciprocating element 162 moves forward a specific stroke. When the compressed gas pressure is removed, reciprocating element 162 returns to its starting position. When actuated, upshift gas actuator 150 causes the movable member 108 to move in the upshifting direction relative to the base member 104. Similarly, downshift gas actuator 154 includes a second reciprocating element 166 (FIG. 18A) which reciprocates in response to successive application and removal of gas pressure. When compressed gas is supplied to downshift gas actuator 154, reciprocating element 166 moves forward a specific stroke. When the compressed gas pressure is removed, reciprocating element 166 returns to its starting position. When actuated, downshift gas actuator 154 causes the movable member 108 to move in the downshifting direction relative to the base member 104.

Figure 16:
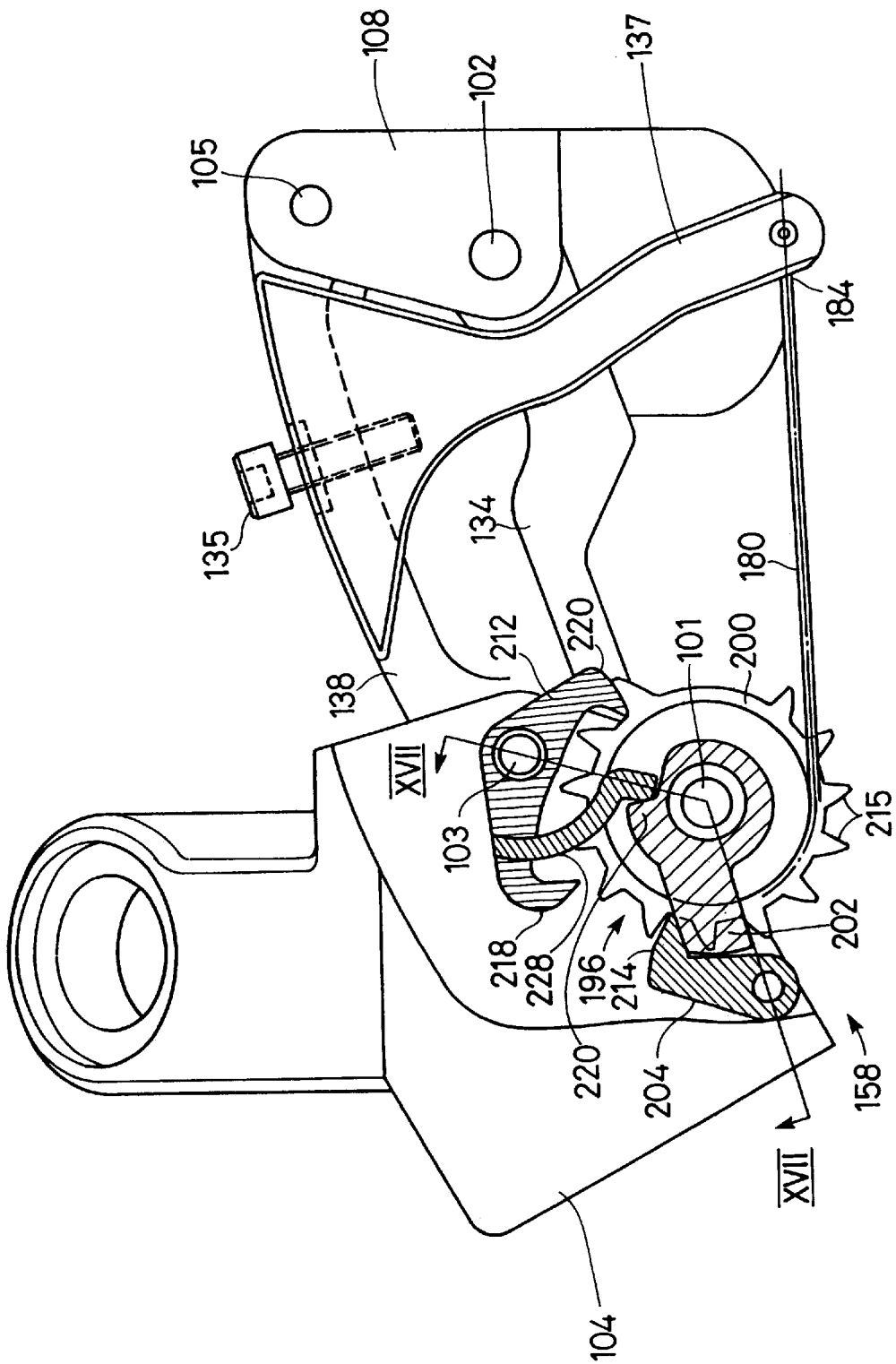
FIG. 16 is a partial cut away view of the gas actuated shifting mechanism shown in FIG. 13 illustrating a particular embodiment of an indexing mechanism.
Figure 17:
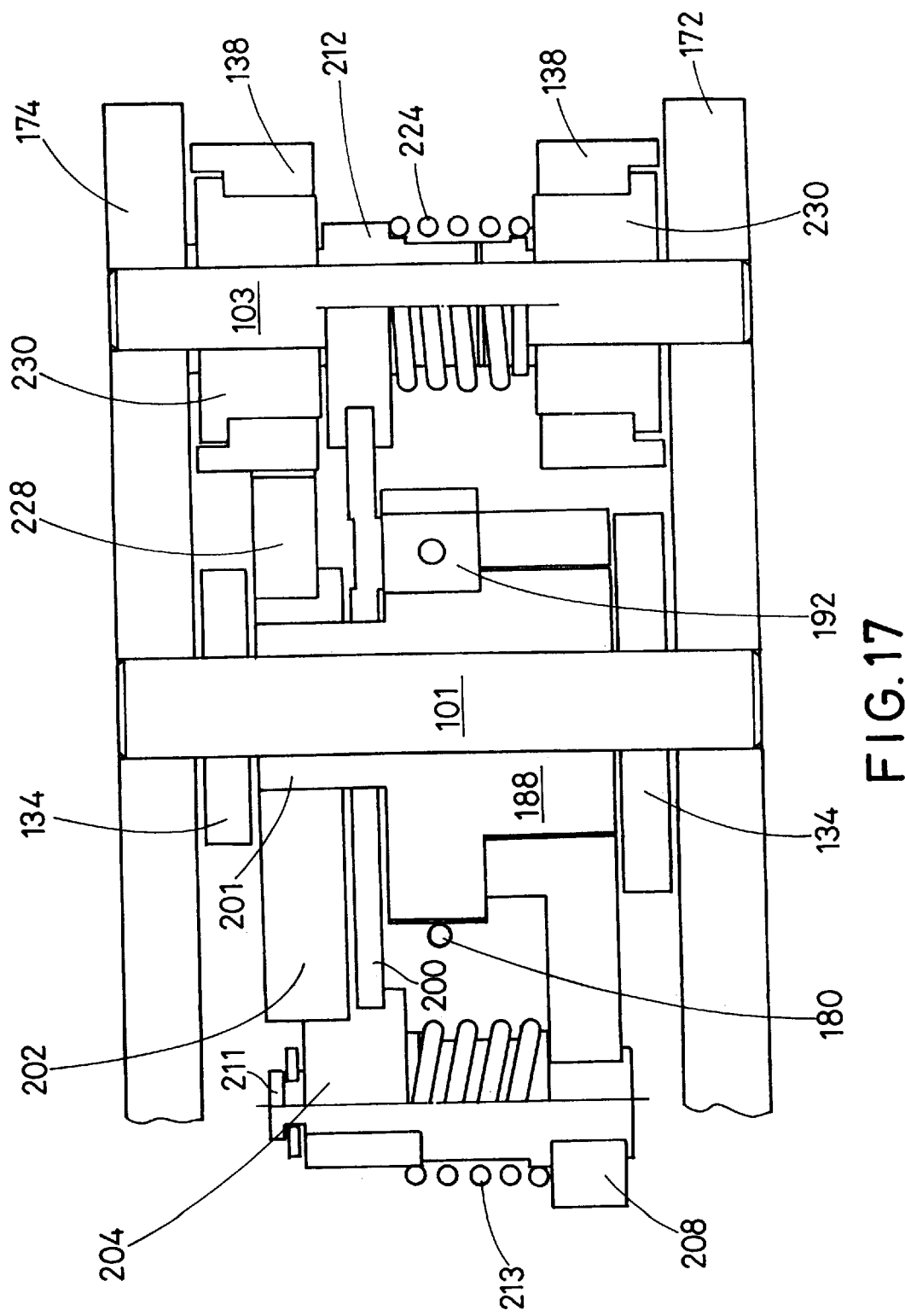
FIG. 17 is a view taken along line XVII—XVII in FIG. 16.

Indexing mechanism 158 is coupled to upshift gas actuator 150, to downshift gas actuator 154 and to coupling mechanism 124 for setting and maintaining movable member 108 in a plurality of positions relative to the sprockets mounted to the rear wheel (not shown). Indexing mechanism 158 is fitted within base member 104 between base member bracket members 172 and 174 (FIG. 17) to reduce the overall size of derailleur 100. More specifically, as shown in FIGS. 16 and 17, indexing mechanism 158 includes a control element 180 in the form of a cable having a first end 184 coupled to coupling mechanism 124 via actuating arm 137, a takeup element 188 in the form of a winding drum rotatably mounted around pivot pin 101 for pulling and releasing a second end 192 of the control element 180, and a ratchet and pawl mechanism 196 coupled to the takeup element 188, to the upshift gas actuator 150 and to the downshift gas actuator 154 for moving takeup element 188 to a selected position and for maintaining takeup element 188 in the selected position.

To prevent undesirable bending forces which tend to wear out the link pivot shafts and decrease efficiency, control element 180 in this embodiment approximately aligns with a centerline of the link 134. This feature, together with the two return springs 139 and 142, balance the return spring force among the components. Depending upon the derailleur design, the return springs 139 and 142 may have different spring constants to fine tune the balanced forces on the derailleur components.

Ratchet and pawl mechanism 196 includes a toothed ratchet wheel 200, a release cam 202, a drive pawl 204, and a positioning pawl 212. Ratchet wheel 200 is mounted around a shaft 201 of takeup element 188 for integral rotation with takeup element 188. The spacing between each ratchet tooth 215 is set so that each ratchet tooth corresponds to one sprocket position. Release cam 202 is coupled to reciprocating element 162 of upshifting gas actuator 150 through a release cam arm 203 (FIG. 19A), and it is further mounted around shaft 201 of takeup element 188 such that release cam 202 is capable of rotation relative to takeup element 188. Drive pawl 204 is coupled to reciprocating element 166 of downshift gas actuator 154 through a drive pawl arm 208 (FIG. 18A) for driving ratchet wheel 200 to the selected position. Drive pawl 204 is rotatably mounted around a pawl shaft 211 which, in turn, is mounted to drive pawl arm 208. A pawl spring 213 is mounted between drive pawl 204 and drive pawl arm 208 for biasing drive pawl 204 so that a drive pawl tooth 214 engages with one of the ratchet teeth 215 of ratchet wheel 200. Positioning pawl 212 is rotatably mounted around pivot pin 103 for selectively maintaining ratchet wheel 200 in the selected position and releasing ratchet wheel 200 from the selected position. Positioning pawl 212 includes pawl teeth 218 and 220. A pawl spring 224 is mounted between positioning pawl 212 and link 138 for biasing positioning pawl 212 clockwise in FIG. 16. Positioning pawl 212 also includes a cam follower arm 228 which engages a cam surface 220 of release cam 202. The function of cam follower arm 228 is discussed below.

FIGS. 18B–18E illustrate the operation of indexing mechanism 158 during a downshifting operation. Initially, ratchet wheel 200 is held in position by the engagement of pawl tooth 220 of positioning pawl 212 with a ratchet tooth 215A. When compressed gas is applied to downshift gas actuator 154, reciprocating element 166 (FIG. 18A) moves to the right which, in turn, causes drive pawl arm 208 to rotate in a clockwise direction. Pawl tooth 214 of drive pawl 204 then presses against a ratchet tooth 215B of ratchet wheel 200 and rotates ratchet wheel 200 clockwise. This, in turn, causes control element 180 to wrap around takeup element 188 so that control element 180 pulls on actuating arm 137 and causes movable member 108 to move in a downshifting direction.

As ratchet wheel 200 rotates, a ratchet tooth 215C presses against pawl tooth 220 of positioning pawl 212 and causes positioning pawl 212 to move counterclockwise as shown in FIG. 18B. As ratchet wheel 200 continues to rotate clockwise, pawl tooth 220 of positioning pawl 212 rides over the tip of ratchet tooth 215C and falls into the recess to the left of ratchet tooth 215C as shown in FIG. 18C. When the compressed gas is removed from downshift gas actuator 154, reciprocating element 166 moves to the left, thus causing drive pawl 204 to move counterclockwise as shown in FIG. 18D. Ratchet wheel 200 does not rotate counterclockwise at this time because it is held in place by the engagement of pawl tooth 220 and ratchet tooth 215C. As a result, drive pawl tooth 214 rides over the tip of a ratchet tooth 215D and falls into the recess to the left of ratchet tooth 215D. Drive pawl 204 now is located in its home position, and a downshift by one sprocket position is completed.

FIGS. 19B–19E illustrate the operation of indexing mechanism 158 during an upshifting operation. Once again, assume ratchet wheel 200 initially is held in position by the engagement of pawl tooth 220 of positioning pawl 212 with ratchet tooth 215A. When compressed gas is applied to upshift gas actuator 150, reciprocating element 162 (FIG. 19A) moves to the right which, in turn, causes release cam arm 203 to rotate in a clockwise direction. Since release cam arm 203 is coupled to release cam 202, release cam 202 rotates clockwise. As shown more clearly in FIG. 19B, clockwise rotation of release cam 202 causes a cam face 250 of release cam 202 to press against pawl tooth 214 of drive pawl 204 to rotate drive pawl 204 counterclockwise and prevent pawl tooth 214 from engaging any ratchet tooth 215. At the same time, cam face 220 of release cam 202 presses against cam follower arm 228 which, in turn, causes positioning pawl 212 to rotate counterclockwise. Pawl tooth 220 then rides up the side of ratchet tooth 215A, and pawl tooth 218 enters the valley between pawl teeth 215E and 215F. Further clockwise rotation of release cam 202 causes further counterclockwise rotation of positioning pawl 212 until pawl tooth 220 clears the tip of ratchet tooth 215A and pawl tooth 218 is located at the bottom of the valley between ratchet teeth 215E and 21 SF as shown in FIG. 19C. When pawl tooth 220 clears the tip of ratchet tooth 215A, ratchet wheel 200 immediately begins to rotate counterclockwise as a result of the bias of return springs 139 and 142, thus unwinding control element 180 from takeup element 188. Rotation of ratchet wheel 200 stops when ratchet tooth 215F contacts pawl tooth 218 as shown in FIG. 19D. When the compressed gas is removed from upshift gas actuator 150, reciprocating element 162 moves to the left, thus causing release cam 202 to move counterclockwise as shown in FIG. 18E. As a result, cam face 250 of release cam 202 allows pawl tooth 214 of drive pawl to return to its home position. Additionally, cam face 220 of release cam 202 allows positioning pawl 212 to rotate clockwise as a result of the bias of pawl spring 224. Pawl tooth 218 then rides up the side of ratchet tooth 21 5F, and pawl tooth 220 simultaneously enters the valley between ratchet teeth 215A and 215G. When pawl tooth 218 clears the tip of ratchet tooth 21SF, ratchet wheel 200 again begins to rotate counterclockwise as a result of the bias of pawl spring 224, further unwinding control element 180 from takeup element 188 until pawl tooth 220 contacts the side of ratchet tooth 215G. Ratchet wheel 200, and hence takeup element 188, are maintained in this position by the engagement of pawl tooth 220 and ratchet tooth 215G, thus completing the upshifting operation.

While the above is a description of various embodiments of the present invention, further modifications may be employed without departing from the spirit and scope of the present invention. For example, while compressed gas having a substantially constant pressure is used in the various embodiments disclosed, one gas pressure may be used for upshifting operations, and a different gas pressure may be used for downshifting operations. While the gas actuators and indexing mechanisms disclosed were built into the derailleur, the gas actuator and indexing mechanism could be formed separately from the derailleur as a stand-alone unit, the separate gas actuator and indexing mechanism could be mounted to a bicycle remote from the derailleur, and the control element could be connected to the derailleur. Thus, the scope of the invention should not be limited by the specific structures disclosed. Instead, the true scope of the invention should be determined by the following claims.

What is claimed is:

1. A gas actuated derailleur for a bicycle comprising:

a base member;

a movable member supporting a chain guide;

a coupling mechanism coupling the base member to the movable member so that the movable member moves relative to the base member; and an actuation mechanism responsive to compressed gas having a substantially constant pressure for causing the movable member to move relative to the base member, wherein the actuation mechanism includes a ratchet that maintains the movable member at a plurality of different positions upon a successive application of compressed gas having the substantially constant pressure value.

2. The derailleur according to claim 1 wherein the coupling mechanism comprises:

a first link member pivotably coupled to the base member and to the movable member;

a second link member pivotably coupled to the base member and to the movable member; and wherein the first link member and the second link member form a four-bar type coupling mechanism with the base member and the movable member.

3. The derailleur according to claim 2 further comprising:

a first return spring having a first end coupled to the base member and a second end coupled to the movable member; and a second return spring having a first end coupled to the base member and a second end coupled to the movable member.

4. The derailleur according to claim 3 wherein the first return spring is positioned on one side of the first link, and wherein the second return spring is positioned on an opposite side of the first link.

5. The derailleur according to claim 1 wherein the is fitted within the base member.

6. The derailleur according to claim 1 wherein the actuation mechanism comprises:

a first gas actuator for causing the movable member to move in a first direction relative to the base member; and a second gas actuator for causing the movable member to move in an opposite direction relative to the base member.

7. The derailleur according to claim 6 further comprising:

a control element having a first end coupled to the coupling mechanism;

a takeup element for pulling and releasing a second end of the control element; and wherein the ratchet coupled to the takeup element, to the first gas actuator and to the second gas actuator for moving the takeup element to a selected position and for maintaining the takeup element in the selected position.

8. The derailleur according to claim 7 wherein the first gas actuator includes a first reciprocating element which reciprocates in response to successive application and removal of gas pressure, and wherein the second gas actuator includes a second reciprocating clement which reciprocates in response to successive application and removal of gas pressure.

9. The derailleur according to claim 8 wherein the ratchet comprises:

a ratchet wheel coupled to the takeup element for movement therewith;

a drive pawl coupled to the first reciprocating element for driving the ratchet wheel to the selected position; and a positioning pawl for selectively maintaining the ratchet wheel in and releasing the ratchet wheel from the selected position.

10. The derailleur according to claim 9 wherein the control element comprises a control cable, and wherein the takeup element comprises a winding drum for alternately winding and unwinding the control cable.

11. The derailleur according to claim 10 wherein the coupling mechanism comprises:

a first link member pivotably coupled to the base member through a first pivot pin and to the movable member through a second pivot pin;

a second link member pivotably coupled to the base member through a third pivot pin and to the movable member through a fourth pivot pin; and wherein the first link member and the second link member form a four-bar type coupling mechanism with the base member and the movable member.

12. The derailleur according to claim 11 wherein the ratchet wheel and the winding drum are rotatably mounted around the first pivot pin.

13. The derailleur according to claim 12 wherein the positioning pawl is rotatably mounted around the third pivot pin.

14. The derailleur according to claim 13 wherein the coupling mechanism includes an actuating arm extending from one of the first link member and the second link member, and wherein the first end of the control element is connected to the actuating arm.

15. The derailleur according to claim 14 wherein the control element aligns with a centerline of the first link.

* * * * *